(12) United States Patent
Chen et al.

(10) Patent No.: US 9,513,514 B2
(45) Date of Patent: Dec. 6, 2016

(54) DISPLAY DEVICE

(71) Applicant: InnoLux Corporation, Miao-Li County (TW)

(72) Inventors: Hung-Kun Chen, Miao-Li County (TW); Hong-Kang Chang, Miao-Li County (TW); Yu-Chien Kao, Miao-Li County (TW); Li-Wei Sung, Miao-Li County (TW); Fang-Jin Lee, Miao-Li County (TW); Hsieh-Li Chou, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 0 days.

(21) Appl. No.: 14/656,363

(22) Filed: Mar. 12, 2015

(65) Prior Publication Data

US 2015/0261030 A1    Sep. 17, 2015

(30) Foreign Application Priority Data

Sep. 24, 2014 (TW) .............................. 103132928 A
Sep. 25, 2014 (TW) .............................. 103133162 A
Oct. 28, 2014 (TW) .............................. 103137140 A

(51) Int. Cl.
*G02F 1/1337* (2006.01)
*G02F 1/1339* (2006.01)
(Continued)

(52) U.S. Cl.
CPC ....... *G02F 1/1339* (2013.01); *G02F 1/136204* (2013.01); *G02F 2001/13396* (2013.01); *G02F 2001/133388* (2013.01)

(58) Field of Classification Search
CPC ................ G02F 1/13394; G02F 1/1337; G02F 1/133514
(Continued)

(56) References Cited

U.S. PATENT DOCUMENTS 6,683,671 B1    1/2004  Morimoto
6,870,591 B2    3/2005  Lee et al.
(Continued)

FOREIGN PATENT DOCUMENTS

CN    102346339    2/2012
CN    102749731    10/2012
(Continued)

OTHER PUBLICATIONS

Chinese language office action dated Dec. 16, 2015, issued in application No. TW 103137142.
(Continued)

*Primary Examiner* — Lucy Chien
(74) *Attorney, Agent, or Firm* — McClure, Qualey & Rodack, LLP

(57) ABSTRACT

A display device is provided. The display device includes a first substrate including a pixel-displaying region; a second substrate disposed opposite to the first substrate; a sealant disposed between the first substrate and the second substrate and disposed outside the pixel-displaying region; and a spacer wall disposed between the first substrate and the second substrate and disposed between the pixel-displaying region and the sealant, wherein a first side of the spacer wall is adjacent to the pixel-displaying region and a second side of the spacer wall is adjacent to the sealant, and a height of the first side is greater than a height of the second side.

18 Claims, 23 Drawing Sheets

(51) Int. Cl.
*G02F 1/1362* (2006.01)
*G02F 1/1333* (2006.01)

(58) Field of Classification Search
USPC .................... 349/106, 123, 138, 153, 155
See application file for complete search history.

(56) References Cited

U.S. PATENT DOCUMENTS

| | | | |
|---|---|---|---|
| 7,379,142 B2 | 5/2008 | Tak et al. | |
| 7,508,481 B2 * | 3/2009 | Whitehead, Jr. | G02F 1/1341 349/153 |
| 7,924,393 B2 | 4/2011 | Fukuoka et al. | |
| 9,151,994 B2 | 10/2015 | Chang et al. | |
| 9,176,339 B2 | 11/2015 | Kim et al. | |
| 2002/0140887 A1 | 10/2002 | Maeda et al. | |
| 2005/0157245 A1 * | 7/2005 | Lin | G02F 1/13394 349/155 |
| 2006/0209235 A1 | 9/2006 | Kim | |
| 2006/0284643 A1 | 12/2006 | Yamamoto et al. | |
| 2008/0170195 A1 | 7/2008 | Kwon et al. | |
| 2009/0273749 A1 * | 11/2009 | Miyamoto | G02F 1/13394 349/114 |
| 2009/0310051 A1 | 12/2009 | Kim | |
| 2011/0025940 A1 * | 2/2011 | Liu | G02F 1/1333 349/56 |
| 2012/0268708 A1 | 10/2012 | Chida | |
| 2012/0327338 A1 | 12/2012 | Kobayashi et al. | |
| 2013/0342795 A1 | 12/2013 | Park et al. | |
| 2014/0029230 A1 | 1/2014 | Oh et al. | |
| 2014/0225849 A1 | 8/2014 | Anno et al. | |

FOREIGN PATENT DOCUMENTS

| | | |
|---|---|---|
| CN | 103513470 | 1/2014 |
| JP | 2003-66467 | 3/2003 |
| JP | 2006-171386 | 6/2006 |
| JP | 3946498 | 7/2007 |
| TW | 200527679 | 8/2005 |
| TW | 200712614 | 4/2007 |
| TW | 201005360 | 2/2010 |
| TW | I335482 | 1/2011 |
| TW | 201202812 | 1/2012 |
| TW | 201307945 | 2/2013 |
| TW | 201321851 | 6/2013 |
| TW | I408471 | 9/2013 |

OTHER PUBLICATIONS

Chinese language office action dated Dec. 28, 2015, issued in application No. TW 103137140.
Chinese language office action dated Mar. 1, 2016, issued in application No. TW 103132928.
Chinese language office action dated Dec. 10, 2015, issued in application No. TW 103140591.
Chinese language office action dated Oct. 15, 2015, issued in application No. TW 103141941.
Chinese language office action dated Nov. 10, 2015, issued in application No. TW 103133162.
Office Action dated Apr. 12, 2016, issued in U.S. Appl. No. 14/643,169.
Office Action dated Apr. 5, 2016, issued in U.S. Appl. No. 14/656,461.

* cited by examiner

DISPLAY DEVICE

CROSS REFERENCE TO RELATED APPLICATIONS

This application claims priority of Taiwan Patent Application No. 103132928, filed on Sep. 24, 2014, which claims the benefit of priority from a provisional application of U.S. Patent Application No. 61/952,929, filed on Mar. 14, 2014, and a provisional application of U.S. Patent Application No. 61/989,046, filed on May 6, 2014; Taiwan Patent Application No. 103133162, filed on Sep. 25, 2014, which claims the benefit of priority from a provisional application of U.S. Patent Application No. 61/952,929 filed on Mar. 14, 2014; Taiwan Patent Application No. 103137140, filed on Oct. 28, 2014, which claims the benefit of priority from a provisional application of U.S. Patent Application No. 61/952,929, filed on Mar. 14, 2014; and a provisional application of U.S. Patent Application No. 62/019,993, filed on Jul. 2, 2014, the entireties of which are incorporated by reference herein.

BACKGROUND

1. Technical Field

The disclosure relates to a display device, and in particular to a display device having a spacer wall.

2. Description of the Related Art

As digital technology develops, display devices are becoming more widely used in our society. For example, display devices have been applied in modern information and communication devices such as televisions, notebooks, computers, mobile phones and smartphones. In addition, each generation of display devices has been developed to be thinner, lighter, smaller and more fashionable than the last.

Display devices contain a pixel-displaying region and a non-display region. The sealant disposed in the non-display region has to be spaced apart from the pixel-displaying region to prevent the sealant from contacting the liquid-crystal material in the pixel-displaying region and resulting in defects in the display devices. However, the distance between the sealant and the pixel-displaying region limits the narrowing of the non-display region of the display devices and thus hinders the display devices from being thinner, lighter, smaller and more fashionable than the last.

Therefore, a display device with a narrowed non-display region is needed.

SUMMARY

The present disclosure provides a display device, including: a first substrate including a pixel-displaying region; a second substrate disposed opposite to the first substrate; a sealant disposed between the first substrate and the second substrate and disposed outside the pixel-displaying region; and a spacer wall disposed between the first substrate and the second substrate and disposed between the pixel-displaying region and the sealant, wherein a first side of the spacer wall is adjacent to the pixel-displaying region and a second side of the spacer wall is adjacent to the sealant, and a height of the first side is greater than a height of the second side.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
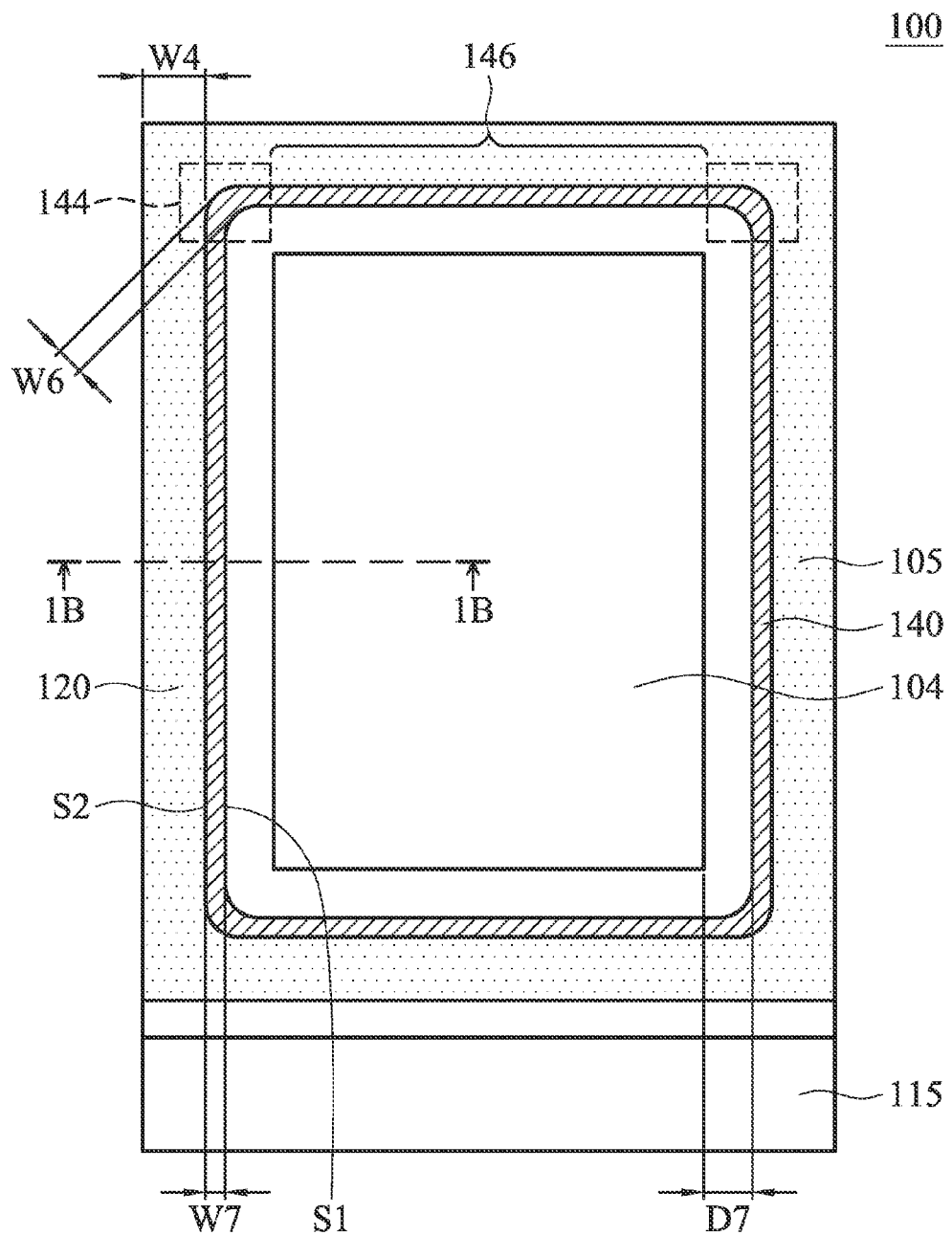
FIG. 1A is a top view of a display device in accordance with some embodiments of the present disclosure.

The display device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first insulating bump disposed on/over a second material layer", may indicate not only the direct contact of the first insulating bump and the second material layer, but also, a non-contact state with one or more intermediate layers between the first insulating bump and the second material layer. In the above situation, the first insulating bump may not directly contact the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer directly contacts the other layer, but it may also indicate that the layer does not directly contact the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Unless defined otherwise, all technical and scientific terms used herein have the same meaning as commonly understood to one of ordinary skill in the art to which this disclosure belongs. It should be appreciated that, in each case, the term, which is defined in a commonly used dictionary, should be interpreted as having a meaning that conforms to the relative skills and the background or the context of the present disclosure, and should not be interpreted in an idealized or overly formal manner unless so defined.

The embodiments of the present disclosure utilize a spacer wall disposed between the pixel-displaying region and the sealant to prevent the sealant from contacting the liquid-crystal material in the pixel-displaying region. Therefore, the distance between the sealant and the pixel-displaying region may be further reduced to narrow the non-display region of the display devices.

Figure 1B:
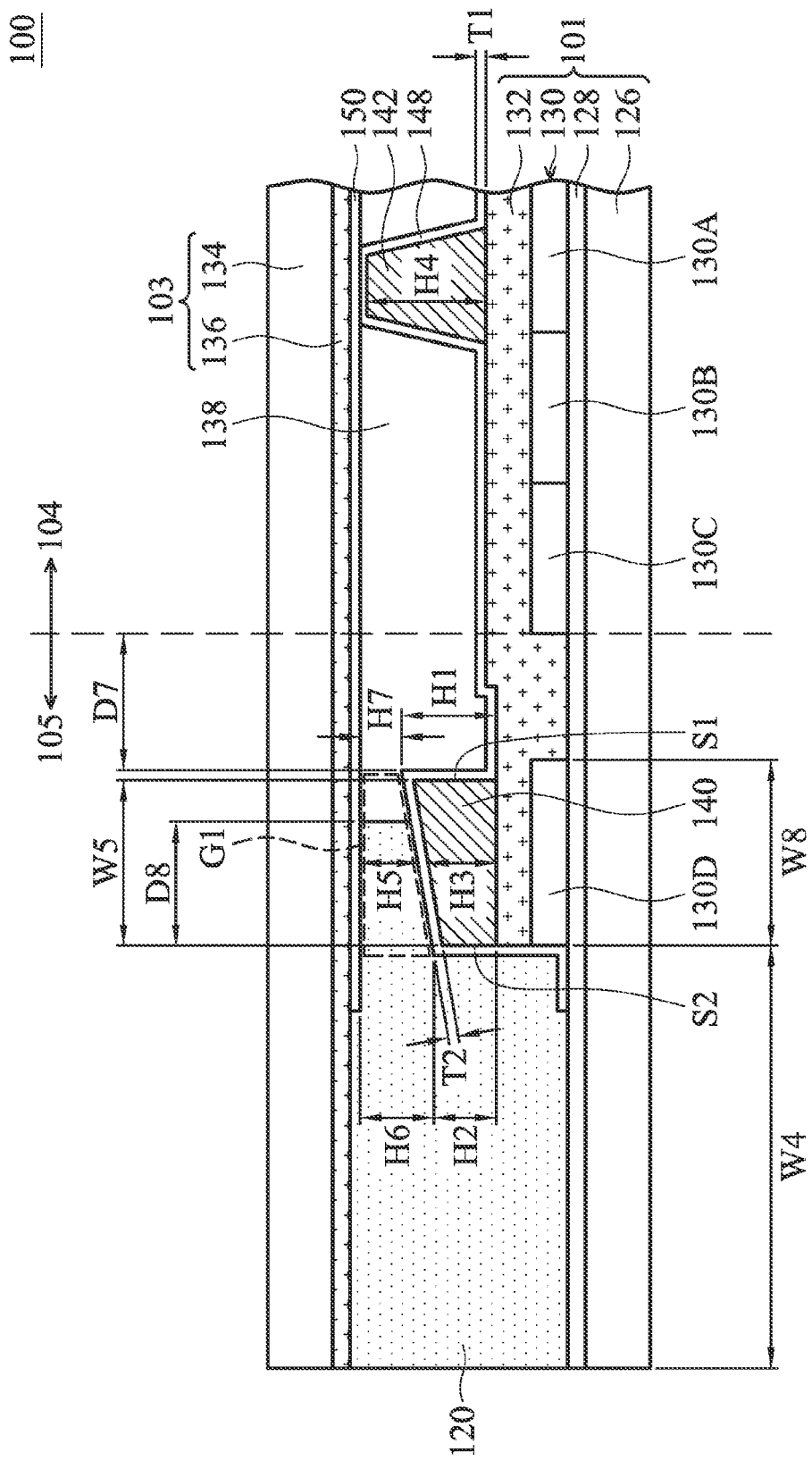
FIG. 1B is a cross-sectional view along line 1B-1B in FIG. 1A in accordance with some embodiments of the present disclosure.

First, referring to FIGS. 1A and 1B. FIG. 1A is a top view of a display device in accordance with some embodiments of the present disclosure, and FIG. 1B is a cross-sectional view along line 1B-1B in FIG. 1A in accordance with some embodiments of the present disclosure. As shown in FIG. 1A, the display device 100 includes a first substrate 101 and a second substrate 103 disposed opposite to the first substrate 101. In addition, as shown in FIGS. 1A and 1B, the display device 100 includes a pixel-displaying region 104 and a non-display region 105 adjacent to the pixel-displaying region 104. In other words, the first substrate 101 and the second substrate 103 may both be divided into a pixel-displaying region 104 and a non-display region 105 adjacent to the pixel-displaying region 104. In addition, the non-display region 105 may include an out lead bonding (OLB) region 115, as shown in FIG. 1A.

The display device 100 may include, but is not limited to, a liquid crystal display such as a thin film transistor liquid crystal display. Alternatively, the liquid crystal display may include, but is not limited to, a twisted nematic (TN) liquid crystal display, a super twisted nematic (STN) liquid crystal display, a double layer super twisted nematic (DSTN) liquid crystal display, a vertical alignment (VA) liquid crystal display, an in-plane switching (IPS) liquid crystal display, a cholesteric liquid crystal display, a blue phase liquid crystal display, or any other suitable liquid crystal display.

Referring to FIG. 1B, the first substrate 101 includes a first transparent substrate 126, a light-shielding layer 128 disposed over the first transparent substrate 126 and a color filter layer 130 disposed over the light-shielding layer 128. In addition, the first substrate 101 may further include a planar layer 132 covering the color filter layer 130 and a portion of the light-shielding layer 128.

The first transparent substrate 126 may include, but is not limited to, a glass substrate, a ceramic substrate, a plastic substrate, or any other suitable transparent substrate. The light-shielding layer 128 is used to shield the non-display region 105 and the elements in the pixel-displaying region 104 other than the pixels. The light-shielding layer 128 may include, but is not limited to, black photoresist, black printing ink, black resin or any other suitable light-shielding materials of various colors. The color filter layer 130 may include color filter layers 130A, 130B and 130C disposed in the pixel-displaying region 104 and a color filter layer 130D disposed in the non-display region 105. Each of the color filter layers 130A, 130B and 130C may independently include a red color filter layer, a green color filter layer, a blue color filter layer, or any other suitable color filter layer. The material of the planar layer 132 may include, but is not limited to, organic silicon oxides photoresist, or inorganic materials such as silicon nitride, silicon oxide, silicon oxynitride (SiON), silicon carbide, aluminum oxide, hafnium oxide, or a multi-layered structure of the above materials.

Still referring to FIG. 1B, the second substrate 103 includes a second transparent substrate 134. The material of the second transparent substrate 134 may include the aforementioned material of the first transparent substrate 126. The material of the first transparent substrate 126 may be the same as or different from that of the second transparent substrate 134. In addition, a transistor such as a thin film transistor (not shown) is disposed in or over the second transparent substrate 134. This transistor is used to control the pixels. The second substrate 103 may further include an insulating layer 136 which covers the second transparent substrate 134 and the transistor. The insulating layer 136 is used to electrically isolate the second substrate 103 from the elements disposed between the first substrate 101 and the second substrate 103. The material of the insulating layer 136 may include, but is not limited to, silicon oxide, silicon nitride, silicon oxynitride, a combination thereof, or any other suitable material.

Still referring to FIGS. 1A and 1B, the display device 100 further includes a sealant 120 and liquid-crystal material 138 disposed between the first substrate 101 and the second substrate 103. The sealant 120 is used to seal the liquid-crystal material 138 between the first substrate 101 and the second substrate 103. The material of the sealant 120 may include, but is not limited to, insulating transparent resin or any other suitable sealant material. The material of the liquid-crystal material 138 may include, but is not limited to, nematic liquid crystal, smectic liquid crystal, cholesteric liquid crystal, blue phase liquid crystal, or any other suitable liquid-crystal material.

As shown in FIGS. 1A and 1B, the sealant 120 is disposed outside the pixel-displaying region 104. In other words, the sealant 120 is disposed in the non-display region 105. In some embodiments, the sealant 120 may surround or enclose the pixel-displaying region 104. In addition, the width W4 of the sealant 120 ranges from about 200 µm to 900 µm, for example from about 500 µm to 800 µm. It should be noted that, if the width W4 of the sealant 120 is too great, for example greater than 900 µm, the non-display region 105 of the display device 100 would be too wide, which in turn hinders the display device 100 from being thinner, lighter, smaller and more fashionable than the last. However, if the width W4 of the sealant 120 is too small, for example smaller than 200 µm, portions of the sealant 120 may break and it will not effectively seal the liquid-crystal material 138.

Still referring to FIGS. 1A and 1B, the display device 100 further includes a spacer wall 140 disposed between the first substrate 101 and the second substrate 103. The spacer wall 140 is also disposed between the pixel-displaying region 104 and the sealant 120 to further prevent the sealant 120 from contacting the liquid-crystal material 138 in the pixel-displaying region 104. In addition, the spacer wall 140 has a first side S1 which is adjacent to the pixel-displaying region 104 and a second side S2 which is adjacent to the sealant 120. The height H1 of the first side S1 is greater than the height H2 of the second side S2. For example, as shown in the figure, the height of the spacer wall 140 gradually decreases from H1 at side S1 (side adjacent to the pixel-displaying region 104) to H2 at side S2 (side adjacent to the sealant 120). It should be noted that, although the spacer wall 140 is disposed over the planar layer 132 of the first substrate 101 in the embodiment shown in FIGS. 1A and 1B, the spacer wall 140 may disposed over the second substrate 103 in other embodiments. This will be described in detail in the following description. In addition, although the spacer wall 140 completely surrounds or encloses the pixel-displaying region 104 in the embodiment shown in FIG. 1A, those skilled in the art will appreciate that the display device 100 may include not only one spacer wall 140 but also a plurality of spacer walls. In addition, the spacer wall 140 may partially surround or enclose the pixel-displaying region 104. Therefore, the inventive concept may be embodied in various forms without being limited to the exemplary embodiments as shown in FIG. 1A.

In addition, the material of the spacer wall 140 may include, but is not limited to, a resist such as a positive resist or a negative resist. The spacer wall 140 may be formed by photolithography and etching steps. In one embodiment, the photolithography steps may include resist patterning. The resist patterning may include steps such as resist coating, soft baking, mask alignment, pattern exposure, post-exposure baking, resist developing and hard baking. The etching step may include reactive ion etch (RIE), plasma etch, or any other suitable etching step.

Referring to FIG. 1B, the spacer wall 140 (or the first alignment layer 148 subsequently disposed over the top surface of the spacer wall 140) does not directly contact the second substrate 103. Therefore, the display device 100 includes a first gap G1 between the spacer wall 140 (or the first alignment layer 148 subsequently disposed over the top surface of the spacer wall 140) and the second substrate 103. The height H5 of the first gap G1 may range from about 0.1 µm to 1.5 µm, for example from about 0.3 µm to 0.8 µm. The height H5 of the first gap G1 refers to the average value of the maximum distance H6 and the minimum distance H7 calculated from the second alignment layer 150 to the top surface of the spacer wall 140 (or the first alignment layer 148 subsequently disposed over the top surface of the spacer wall 140). In other words, H5=(H6+H7)/2. In addition, the sealant 120 may directly contact the spacer wall 140, and portions of the sealant 120 may further extend from the second side S2 to the first side S1 by a distance D8. The distance D8 may range from about 20% to 90% of the width W5 of the spacer wall 140, for example from about 40%-70%. It should be noted that, if the distance D8 is too great, for example greater than 90% of the width W5 of the spacer wall 140, the sealant 120 may contact and contaminate the liquid-crystal material 138 in the pixel-displaying region 104, which in turn increases the risk of defects and lowers the yield. In addition, if the height H5 of the first gap G1 is too large, for example larger than 1.5 µm, the spacer wall 140 cannot effectively prevent the sealant 120 from extending into the pixel-displaying region 104 through the first gap G1, and the height difference between the spacer wall 140 and the main spacer 142 is too large, the sealant 120 may contact and contaminate the liquid-crystal material 138 in the pixel-displaying region 104, which in turn results in mura such as frame mura in the display device 100. However, if the height H5 of the first gap G1 is too small, for example smaller than 0.1 µm, the top surface of the spacer wall 140 would be too close to the second substrate 103 such that the sealant 120 extending into the first gap G1 may push the second substrate 103 away from the first substrate 101, which in turn results in mura such as gap mura in the display device 100 and lower the yield.

Since the spacer wall 140 may prevent the sealant 120 from contacting the liquid-crystal material 138 in the pixel-displaying region 104, the distance between the sealant 120 and the pixel-displaying region 104 may be further reduced to narrow the non-display region 105 of the display device 100 and make the display device 100 thinner, lighter, smaller and more fashionable than the last. In addition, since the height H1 of the first side S1 of the spacer wall 140 is greater than the height H2 of the second side S2, even though the sealant 120 extends into the first gap G1 between the spacer wall 140 and the second substrate 103, the higher height H1 of the first side S1 may prevent the sealant 120 from extending into the pixel-displaying region 104 through the first gap G1 and thus prevent the sealant 120 from contacting the liquid-crystal material 138 in the pixel-displaying region 104 and resulting in defects in the display device 100. As shown in FIG. 1B, without considering the portion of the sealant 120 extending into the first gap G1, the distance between the sealant 120 and the pixel-displaying region 104 is the total distance of the width W5 of the spacer wall 140, the thickness T1 of the first alignment layer 148 disposed over the two sides S1 and S2 of the spacer wall 140 and the distance D7 between the first side S1 of the spacer wall 140 and the pixel-displaying region 104. In other words, the distance between the sealant 120 and the pixel-displaying region 104 is W5+2×T1+D7.

The height difference between the height H1 of the first side S1 of the spacer wall 140 and the height H2 of the second side S2 may range from about 0.01 μm to 0.3 μm, for example from about 0.05 μm to 0.1 μm. It should be noted that, if the height difference between the first side S1 and the second side S2 is too great, for example greater than 0.3 μm, the height H2 of the second side S2 would be too low and the spacer wall 140 cannot effectively prevent the sealant 120 from contacting the liquid-crystal material 138 in the pixel-displaying region 104. However, if the height difference is too small, for example smaller than 0.01 μm, the spacer wall 140 cannot utilize the height difference between the first side S1 and the second side S2 to prevent the sealant 120 from extending into the pixel-displaying region 104 through the first gap G1.

Still referring to FIG. 1B, the width W5 of the spacer wall 140 may range from about 10 μm to 200 μm, for example from about 60 μm to 110 μm. It should be noted that, if the width W5 of the spacer wall 140 is too large, for example larger than 200 μm, the non-display region 105 of the display device 100 would be too broad, which in turn hinders the display device 100 from being thinner, lighter, smaller and more fashionable than the last. However, if the width W5 of the spacer wall 140 is too small, for example smaller than 10 μm, the spacer wall 140 cannot effectively prevent the sealant 120 from contacting the liquid-crystal material 138 in the pixel-displaying region 104.

In addition, the distance D7 between the first side S1 of the spacer wall 140 and the pixel-displaying region 104 may range from about 20 μm to 200 μm, for example from about 50 μm to 100 μm. It should be noted that, if the distance D7 is too large, for example larger than 200 μm, the non-display region 105 of the display device 100 would be too broad, which in turn hinders the display device 100 from being thinner, lighter, smaller and more fashionable than the last. However, if the distance D7 is too small, for example smaller than 20 μm, the sealant 120 may contact the liquid-crystal material 138 in the pixel-displaying region 104, which in turn increase the risk of defects and lower the yield.

In addition, the height H3 of the spacer wall 140 may be adjusted by altering the distance D7 between the first side S1 of the spacer wall 140 and the pixel-displaying region 104. In particular, the lower the distance D7, the lower the reflow effect of the spacer wall 140 and the spacer wall 140 may have a greater height. On the other hand, the greater the distance D7, the greater the reflow effect of the spacer wall 140 and the spacer wall 140 may have a lower height. Therefore, by altering the distance D7, the height difference between the main spacer 142 and the spacer wall 140 (namely H4−H3) may be adjusted to fall in the preferable range mentioned below (namely about 0.1 μm to 1.5 μm).

Still referring to FIG. 1B, the display device 100 further includes a main spacer 142 disposed between the first substrate 101 and second substrate 103. The main spacer 142 is disposed inside the pixel-displaying region 104. The main spacer 142 and the spacer wall 140 may be formed by the same photolithography and etching steps. However, the main spacer 142 may be formed by other photolithography and etching steps.

In addition, the height H4 of the main spacer 142 is greater than the height H3 of the spacer wall 140. The height H3 of the spacer wall 140 refers to the average value of the height H1 of the first side S1 of the spacer wall 140 and the height H2 of the second side S2 of the spacer wall 140. In other words, H3=(H1+H2)/2. In some embodiments, the height H4 of the main spacer 142 is greater than the height H3 of the spacer wall 140 by a height difference ranging from about 0.1 μm to 1.5 μm, for example from about 0.3 μm to 0.8 μm. It should be noted that, if the height difference between the main spacer 142 and the spacer wall 140 is too large, for example larger than 1.5 μm, mura such as frame mura would be resulted in the display device 100. However, if the height difference between the main spacer 142 and the spacer wall 140 is too small, for example smaller than 0.1 μm, the top surface of the spacer wall 140 would be too close to the second substrate 103 such that the sealant 120 extending into the first gap G1 may push the second substrate 103 away from the first substrate 101, which in turn results in mura such as gap mura in the display device 100 and lower the yield.

Referring back to FIG. 1A, the spacer wall 140 includes a corner region 144 and a longitudinal region 146. The width W6 of the corner region 144 is different from the width W7 of the longitudinal region 146. For example, in the embodiment shown in FIG. 1A, the width W6 of the corner region 144 is greater than the width W7 of the longitudinal region 146.

Figure 2:
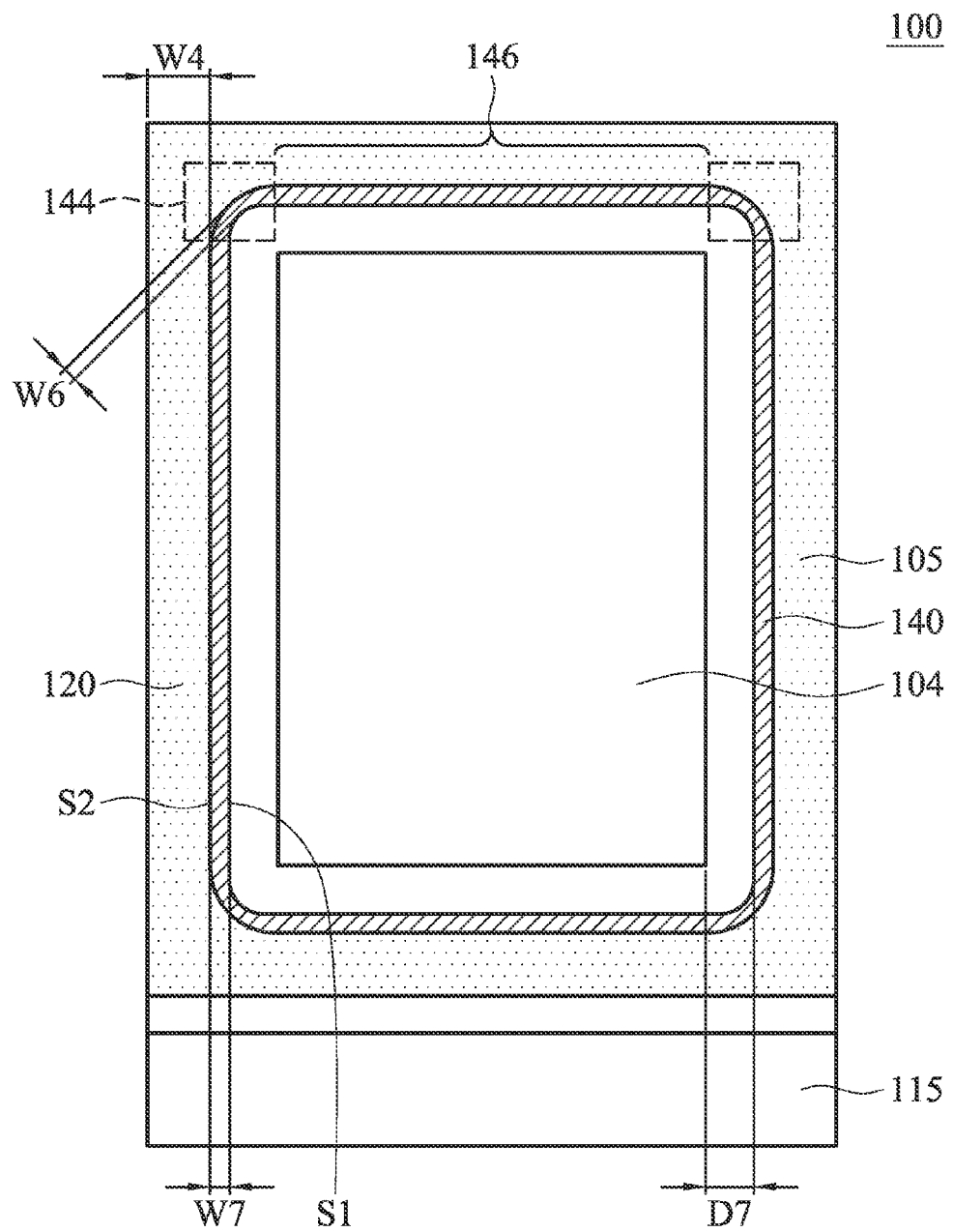
FIG. 2 is a top view of a display device in accordance with another embodiment of the present disclosure.
Figure 3:
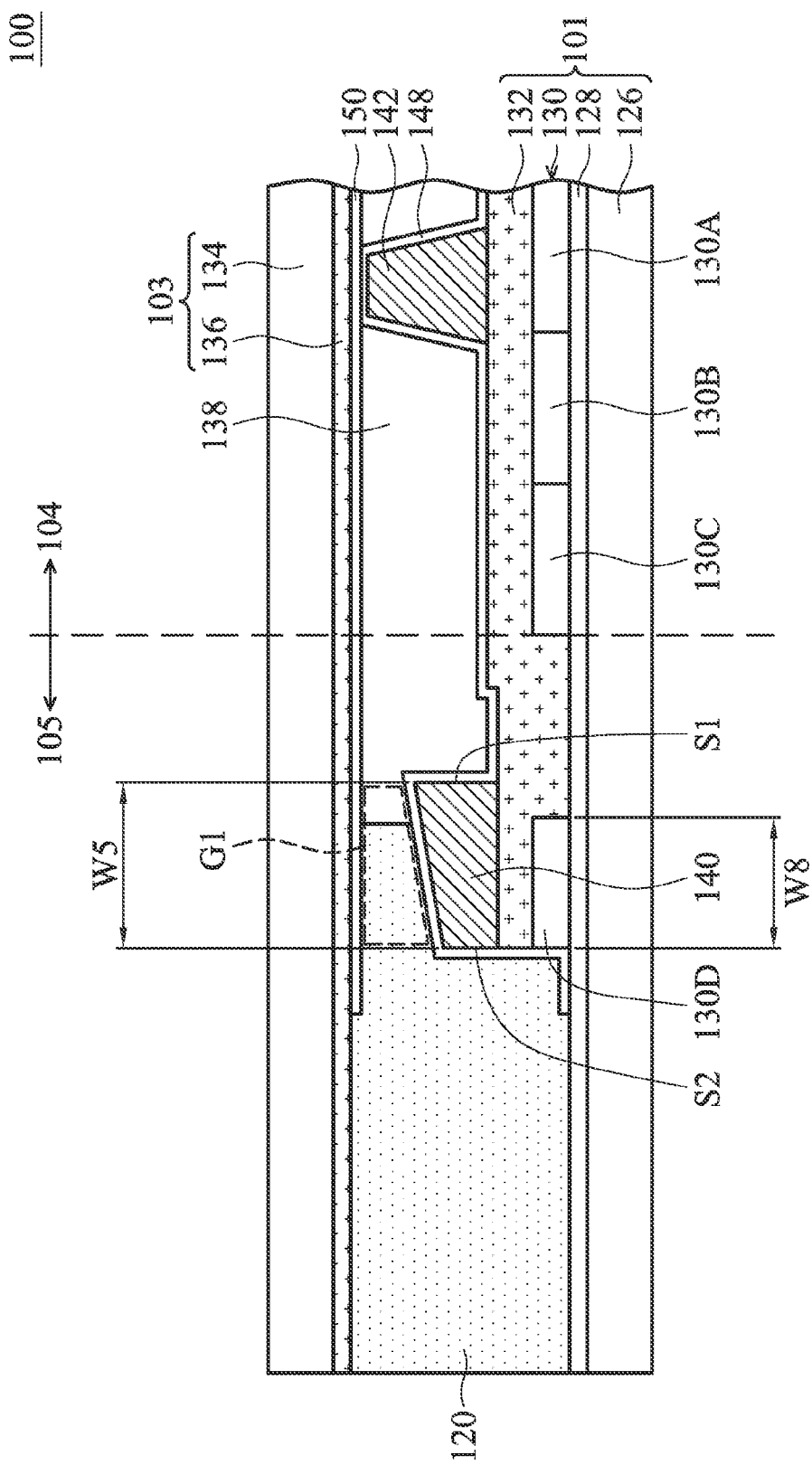
FIG. 3 is a cross-sectional view of a display device in accordance with another embodiment of the present disclosure.

However, the width of the corner region may be smaller than the width of the longitudinal region. Referring to FIG. 2, which is a top view of a display device in accordance with another embodiment of the present disclosure. The difference between the embodiment shown in FIG. 2 and the embodiment shown in FIG. 1A is that the width W6 of the corner region 144 is smaller than the width W7 of the longitudinal region 146. In addition, those skilled in the art will appreciate that the width of the corner region may be the same as the width of the longitudinal region. Therefore, the exemplary embodiments put forth in FIGS. 1A, 1B and 2 are merely for the purpose of illustration, and the inventive concept may be embodied in various forms without being limited to the exemplary embodiments as shown in FIGS. 1A, 1B and 2. Note that the same or similar elements or layers corresponding to those of the display device are denoted by like reference numerals. The same or similar elements or layers denoted by like reference numerals have the same or similar materials, manufacturing processes and functions. These will not be repeated for the sake of brevity.

Referring back to FIG. 1B, the display device 100 may further include a first alignment layer 148 disposed over the planar layer 132 and covering the spacer wall 140 and the main spacer 142. The display device 100 may further include a second alignment layer 150 disposed over the insulating layer 136. The first alignment layer 148 and the second alignment layer 150 are layers used to induce the liquid crystal molecules to align with specific direction. The materials of each of the first alignment layer 148 and second alignment layer 150 may independently include, but are not limited to, polyimide, or any other suitable alignment material. In addition, the first alignment layer 148 disposed over the top surface of the main spacer 142 may directly contact the second alignment layer 150. The thickness of the first alignment layer 148 may range from about 300 Å to 1000 Å, for example from about 400 Å to 700 Å. The thickness T1 of the first alignment layer 148 over the planar layer 132 is greater than or equal to the thickness T2 of the first alignment layer 148 over the spacer wall 140.

Still referring to FIG. 1B, as mentioned above, the color filter layer 130 of the first substrate 101 may include the first color filter layer 130D disposed in the non-display region 105. The first color filter layer 130D is disposed under the spacer wall 140 and corresponds to the spacer wall 140. In addition, as shown in FIG. 1B, the width W8 of the first color filter layer 130D is greater than the width W5 of the spacer wall 140. However, it should be noted that the width of the first color filter layer may also be smaller than the width of the spacer wall. For example, in the embodiment shown in FIG. 3, the width W8 of the first color filter layer 130D is smaller than the width W5 of the spacer wall 140. In addition, those skilled in the art will appreciate that the width of the first color filter layer may equal to the width of the spacer wall. Therefore, the exemplary embodiments set forth in FIGS. 1A, 1B, 2 and 3 are merely for the purpose of illustration, and the inventive concept may be embodied in various forms without being limited to the exemplary embodiments as shown in FIGS. 1A, 1B, 2 and 3.

The height H3 of the spacer wall 140 may be adjusted by altering the width W8 of the first color filter layer 130D which is disposed under the spacer wall 140 and corresponds to the spacer wall 140. In particular, the smaller the width W8 of the first color filter layer 130D, the greater the reflow effect of the spacer wall 140 and the spacer wall 140 may have a lower height. On the other hand, the larger the width W8 of the first color filter layer 130D, the lower the reflow effect of the spacer wall 140 and the spacer wall 140 may have a greater height. Therefore, by altering the width W8 of the first color filter layer 130D, the height difference between the main spacer 142 and the spacer wall 140 (namely H4–H3) may be adjusted to fall in the preferred range mentioned above (namely about 0.1 μm to 1.5 μm).

Figure 4:
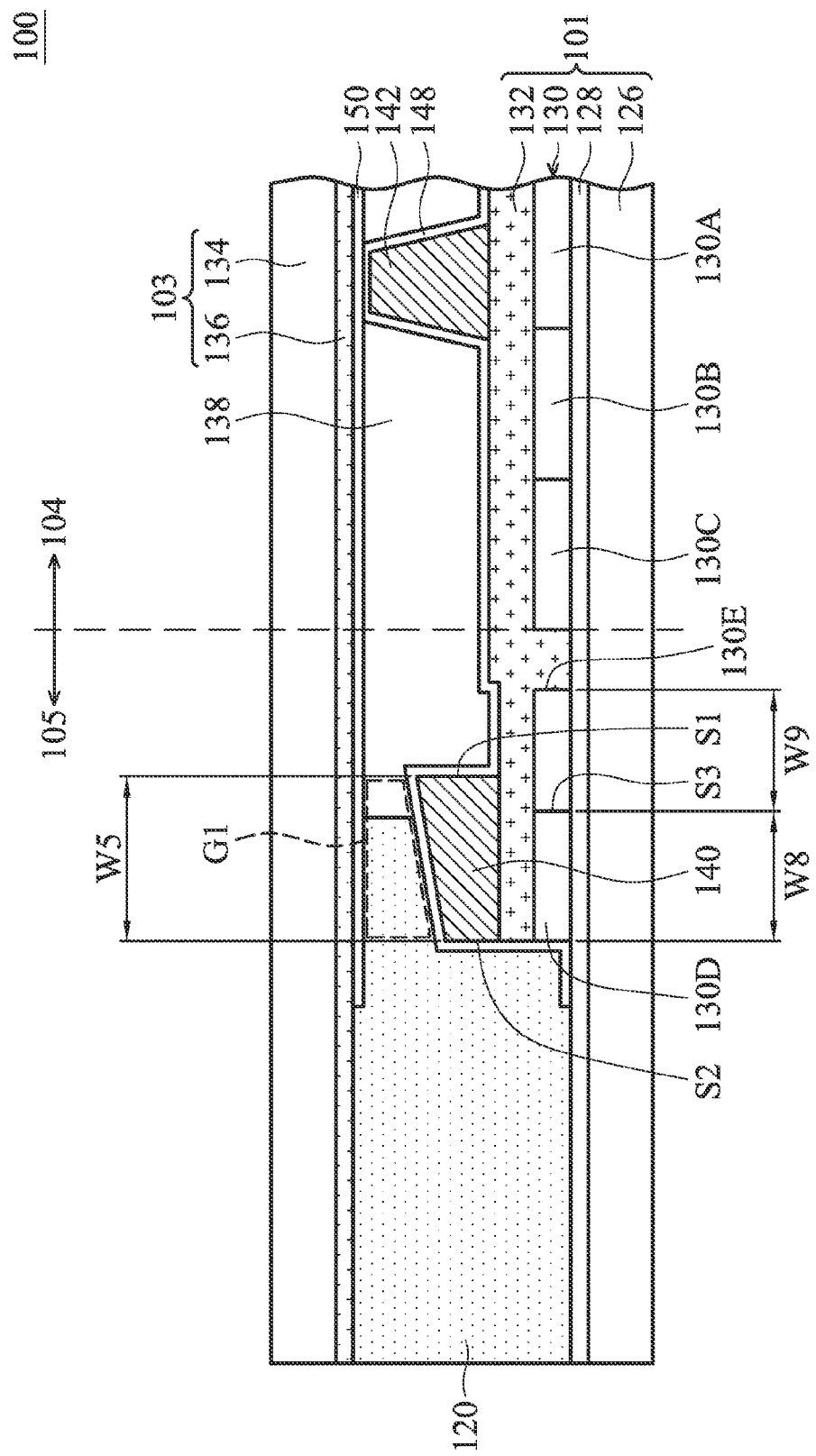
FIG. 4 is a cross-sectional view of a display device in accordance with another embodiment of the present disclosure.

In addition, referring to FIG. 4, which is a cross-sectional view of a display device in accordance with another embodiment of the present disclosure. The difference between the embodiment shown in FIG. 4 and the embodiments shown in FIGS. 1A-3 is that the color filter layer 130 of the first substrate 101 further includes a second color filter layer 130E which is disposed under the spacer wall 140 and corresponds to the spacer wall 140. The second color filter layer 130E is different from the first color filter layer 130D. The boundary S3 between the first color filter layer 130D and second color filter layer 130E is disposed under the spacer wall 140 and corresponds to the spacer wall 140. However, it should be noted that the boundary S3 between the first color filter layer 130D and second color filter layer 130E may also correspond to the first side S1 of the spacer wall 140 or the region outside the first side S1. Therefore, the exemplary embodiment set forth in FIG. 4 is merely for the purpose of illustration, the inventive concept may be embodied in various forms without being limited to the exemplary embodiments as shown in FIG. 4. In addition, similar to the first color filter layer 130D, the height H3 of the spacer wall 140 may be adjusted by altering the width W9 of the second color filter layer 130E which is disposed under the spacer wall 140 and corresponds to the spacer wall 140.

Figure 5:
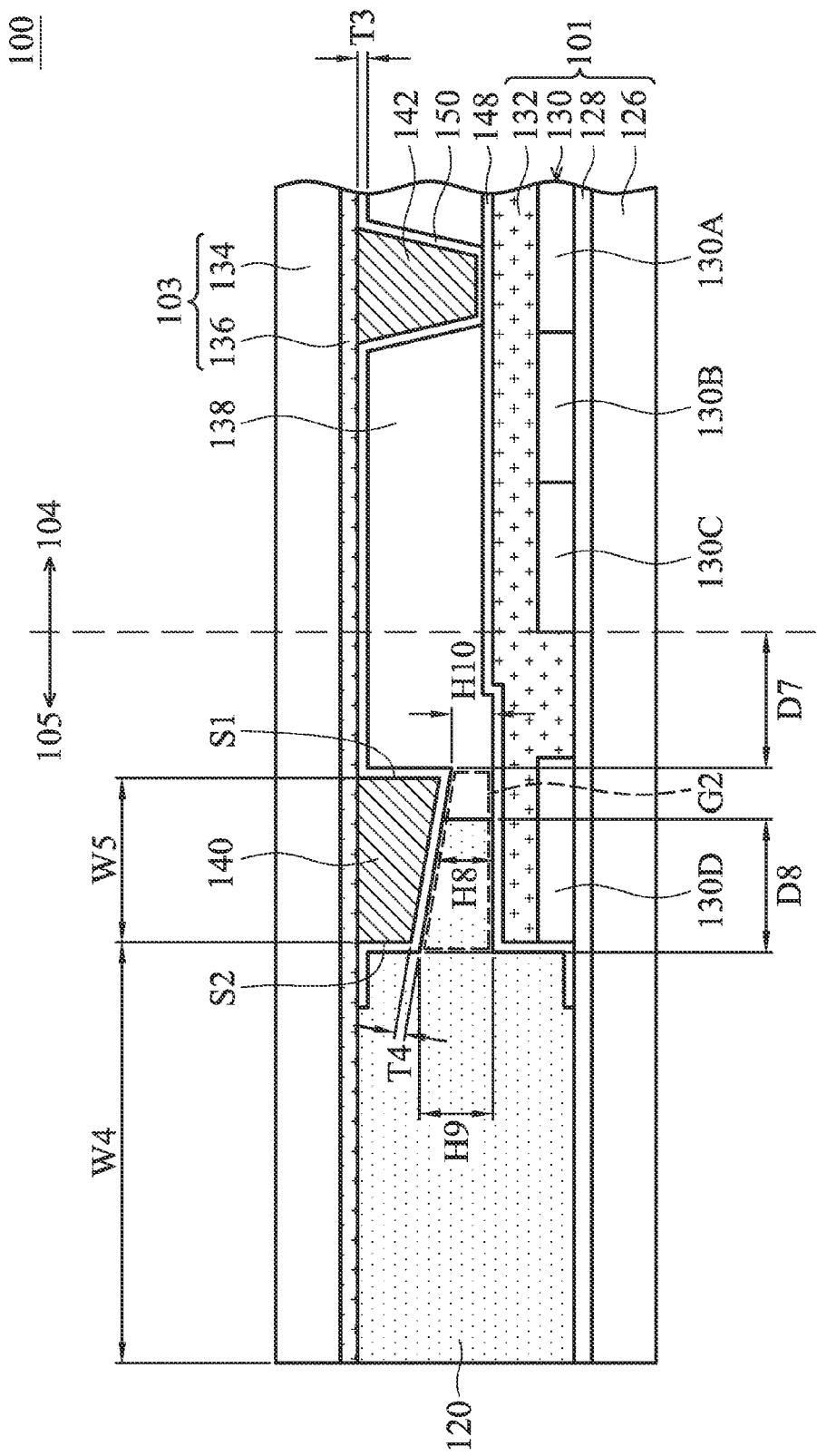
FIG. 5 is a cross-sectional view of a display device in accordance with another embodiment of the present disclosure.

FIG. 5 is a cross-sectional view of a display device in accordance with another embodiment of the present disclosure. The difference between the embodiment shown in FIG. 5 and the embodiments shown in FIGS. 1A-4 is that the spacer wall 140 is disposed over the insulating layer 136 of the second substrate 103, rather than being disposed over the planar layer 132 of the first substrate 101, as in the embodiments shown in FIGS. 1A-4. In addition, as shown in FIG. 5, the display device 100 may further include the second alignment layer 150 disposed over the insulating layer 136 and covering the spacer wall 140. The material of the second alignment layer 150 may be the same as the material of the first alignment layer 148. In addition, the second alignment layer 150 disposed over the top surface of the main spacer 142 may directly contact the first alignment layer 148. The thickness T3 of the second alignment layer 150 over the insulating layer 136 is greater than or equal to the thickness T4 of the second alignment layer 150 over the spacer wall 140.

In addition, the spacer wall 140 (or the second alignment layer 150 disposed over the top surface of the spacer wall 140) does not directly contact the first substrate 101. Therefore, the display device 100 includes a second gap G2 between the spacer wall 140 (or the second alignment layer 150 disposed over the top surface of the spacer wall 140) and the first substrate 101. The height H8 of the second gap G2 may range from about 0.1 μm to 1.5 μm, for example from about 0.3 μm to 0.8 μm. The height H8 of the second gap G2 refers to the average value of the maximum distance H9 and the minimum distance H10 calculated from the first alignment layer 148 to the top surface of the spacer wall 140 (or the second alignment layer 150 disposed over the top surface of the spacer wall 140). In other words, H8=(H9+H10)/2. It should be noted that, if the height H8 of the second gap G2 is too large, for example larger than 1.5 μm, the spacer wall 140 cannot effectively prevent the sealant 120 from extending into the pixel-displaying region 104 through the second gap G2, and the height difference between the spacer wall 140 and the main spacer 142 is too large, mura such as frame mura in the display device 100 would result. However, if the height H8 of the second gap G2 is too small, for example smaller than 0.1 μm, the top surface of the spacer wall 140 would be too close to the first substrate 101 such that the sealant 120 extending into the second gap G2 may push the first substrate 101 away from the second substrate 103, which in turn results in mura such as gap mura in the display device 100 and lower the yield.

In summary, since the spacer wall of the present disclosure may prevent the sealant from contacting the liquid-crystal material in the pixel-displaying region, the distance between the sealant and the pixel-displaying region may be reduced further to narrow the non-display region of the display devices and display device may be thinner, lighter, smaller and more fashionable than the last. In addition, since the side of the spacer wall adjacent to the pixel-displaying region has a greater height, even though the sealant extends into the gap, the sealant cannot extends into the pixel-displaying region, which in turn may further prevent the sealant from contacting the liquid-crystal material and resulting in defects in the display device.

In addition, the embodiments of the present disclosure change the configuration of the wire in the display device to reduce the area occupied by the wire in the integrated circuit. In addition, the present disclosure also utilizes a patterned test pad to improve the reliability and yield of the display device.

First, a display device comprises a driving unit, a gate-driving circuit, a test pad and wires. The gate-driving circuit, a driving unit, the test pad and the wires are disposed on a substrate. The driving unit may be, but is not limited to, a driving unit. The driving unit includes the gate-signal output bump. The gate-signal output bump is electrically connected to the gate-driving circuit through one wire and is electrically connected to the test pad through another wire. Accordingly, the two wires mentioned above occupy two regions of the driving unit (corresponding to region 113A and region 113B in FIG. 6B). When the amount of signal output contacts of the output bump increases as the resolution of the display panel is enhanced, not only the area used to accommodate the wire electrically connecting to the signal output contacts of the output bump would be insufficient, but also the portion of the substrate below the chip in which the wires pass through would be insufficient.

Figure 6A:
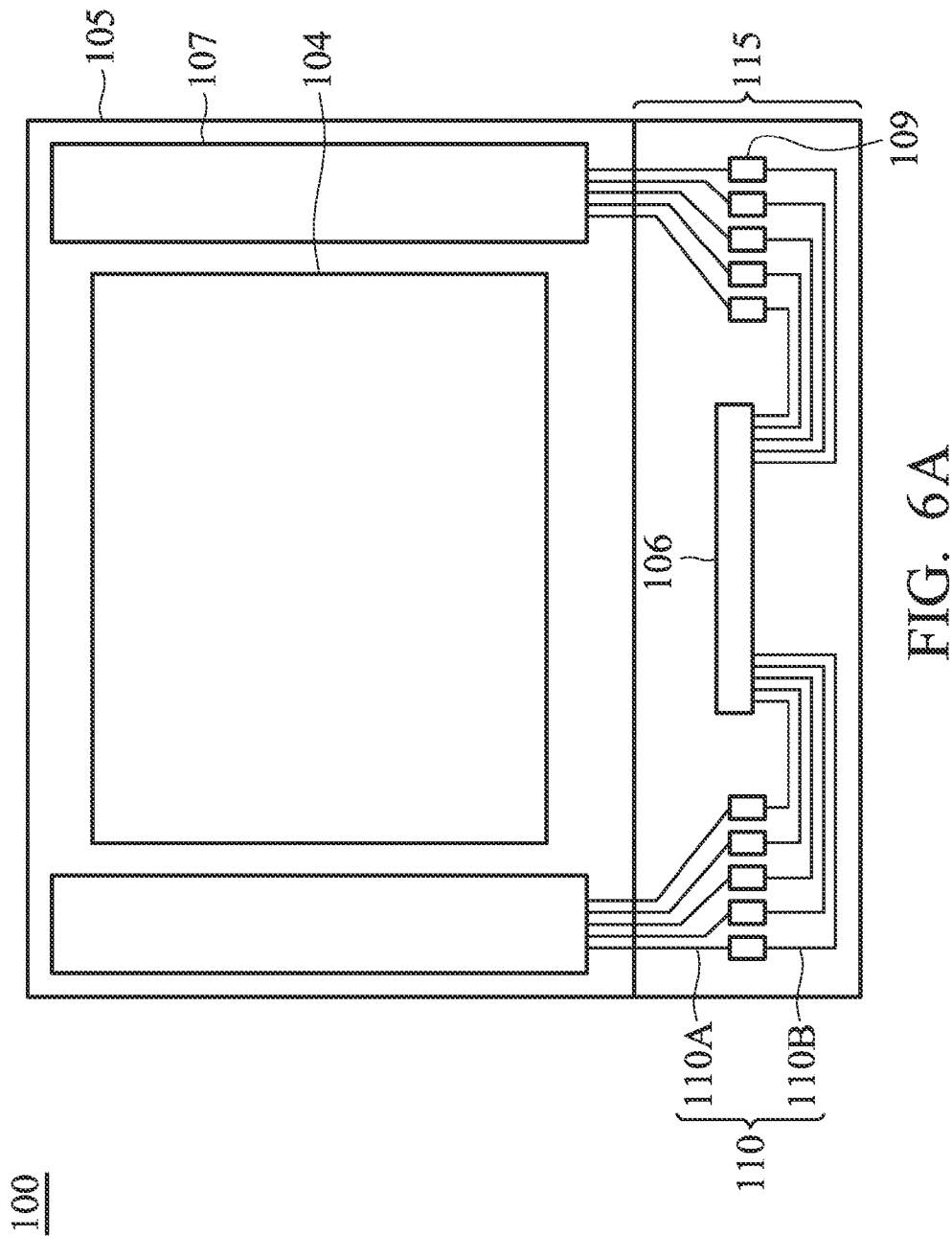
FIG. 6A is a top view of a display device in accordance with some embodiments of the present disclosure.

Therefore, in order to reduce the area occupied by the wire, another configuration of the wire in the display device is provided by the present disclosure. FIG. 6A is a top view of a display device in accordance with some embodiments of the present disclosure. As shown in FIG. 6A, the display device 100 includes a display region 104 and a non-display region 105 adjacent to the display region 104. The display region 104 is the region in the display device 100 in which the pixels including transistors display an image. The transistor may include, but is not limited to, an amorphous silicon thin film transistor or an LTPS thin film transistor. Therefore, the display region 104 is also referred to as a pixel-displaying region 104. The non-display region 105 is the region in the display device 100 except or other than the display region 104. In this embodiment, the non-display region 105 surrounds or encloses the display region 104. In addition, the non-display region 105 includes a gate-driving circuit (such as gate driver on panel, GOP) 107 disposed at the two opposite sides of the display region 104, a driving unit 106 and a test pad 109 disposed in the out lead bonding (OLB) region 115. In addition, the non-display region 105 further comprises a wire 110, and a portion of the wire 110 is disposed in the out lead bonding region 115. In other embodiments, the gate-driving circuit 107 may be disposed only at one side of the display region 104.

The display device 100 may include, but is not limited to, a liquid-crystal display, such as a thin film transistor liquid crystal display. The driving unit 106 may provide a source signal to the pixels (not shown) in the display region 104 and/or provide a gate signal to the gate-driving circuit 107. The gate-driving circuit 107 may provide a scanning pulse signal to the pixels in the display region 104 and control the pixels (not shown) disposed in the display region 104 cooperating with the aforementioned source signal to display an image in the display device 100. The gate-driving circuit 107 may comprise, but is not limited to, a gate-on-panel (GOP) or any other suitable gate-driving circuit.

In addition, the driving unit 106 is electrically connected to the gate-driving circuit 107 through the test pad 109. The test pad 109 may be electrically connected to the gate-driving circuit 107 and the driving unit 106 by any suitable method. For example, in one embodiment, as shown in FIG. 6A, the test pad 109 is electrically connected to the gate-driving circuit 107 and the driving unit 106 through the wire 110.

Figure 6B:
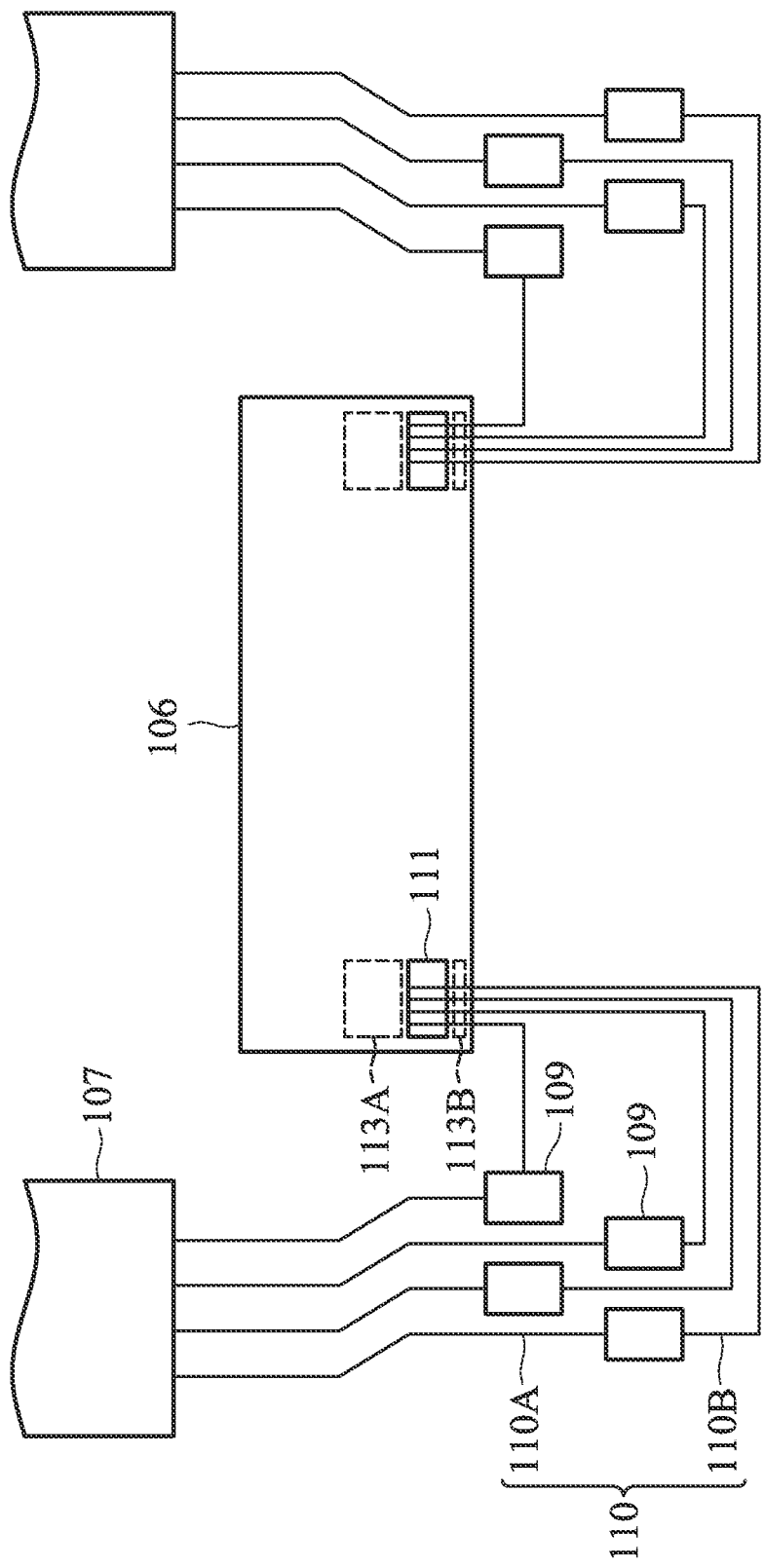
FIG. 6B is an enlarged figure of a portion of the display device in FIG. 6A.

By electrically connecting the driving unit 106 to the gate-driving circuit 107 through the test pad 109, the present disclosure may reduce the area occupied by the wire 110 in the driving unit 106, particular as illustrated in FIG. 6B, which is an enlarged figure of a portion of the display device 100 in FIG. 6A. As shown in FIG. 6B, the gate-signal output bump 111 of the driving unit 106 is electrically connected to the test pad 109 through the wire 110B. Then the test pad 109 is electrically connected to the gate-driving circuit 107 through another wire 110A. Compared to the aforementioned display device known to the applicant, the wires 110A and 110B in the known display device pass through the regions 113A and 113B respectively. Therefore, the area of the regions 113A and 113B must be occupied at the lower portion of the driving unit 106. However, the wire 110 of the present disclosure only occupies the area of the region 113B in the driving unit 106 and does not occupy the area of the region 113A. As the amount of signal output wire of the driving unit 106 increases when the resolution of the display panel is enhanced, the region 113A may be used to dispose other output wire. Therefore, the problem of there being insufficient area for the output wire in the chip such as the driving unit may be solved.

Furthermore, in order to improve the reliability and yield of the display device 100 in FIG. 6A, the test pad 109 of the display device 100 in the present disclosure may be a patterned test pad. In particular, in the testing step for testing the function of the display device 100, the test pad 109 must be touched by a probe, which would result in a hole in the conductive layer of the test pad 109 when the probe contacts the test pad 109. The hole in the conductive layer would be corroded and damaged by water and oxygen as time goes by, resulting in an open circuit or a malfunction of the wire between the driving unit 106 and the gate-driving circuit 107, which in turn would lower the reliability and yield of the display device 100. In order to solve the above technical problem, the test pad of the present disclosure may be patterned to be divided into a plurality of functional regions and sections which are separated apart from each other, and these functional regions and sections are electrically connected to each other through a connecting layer.

Figure 7:
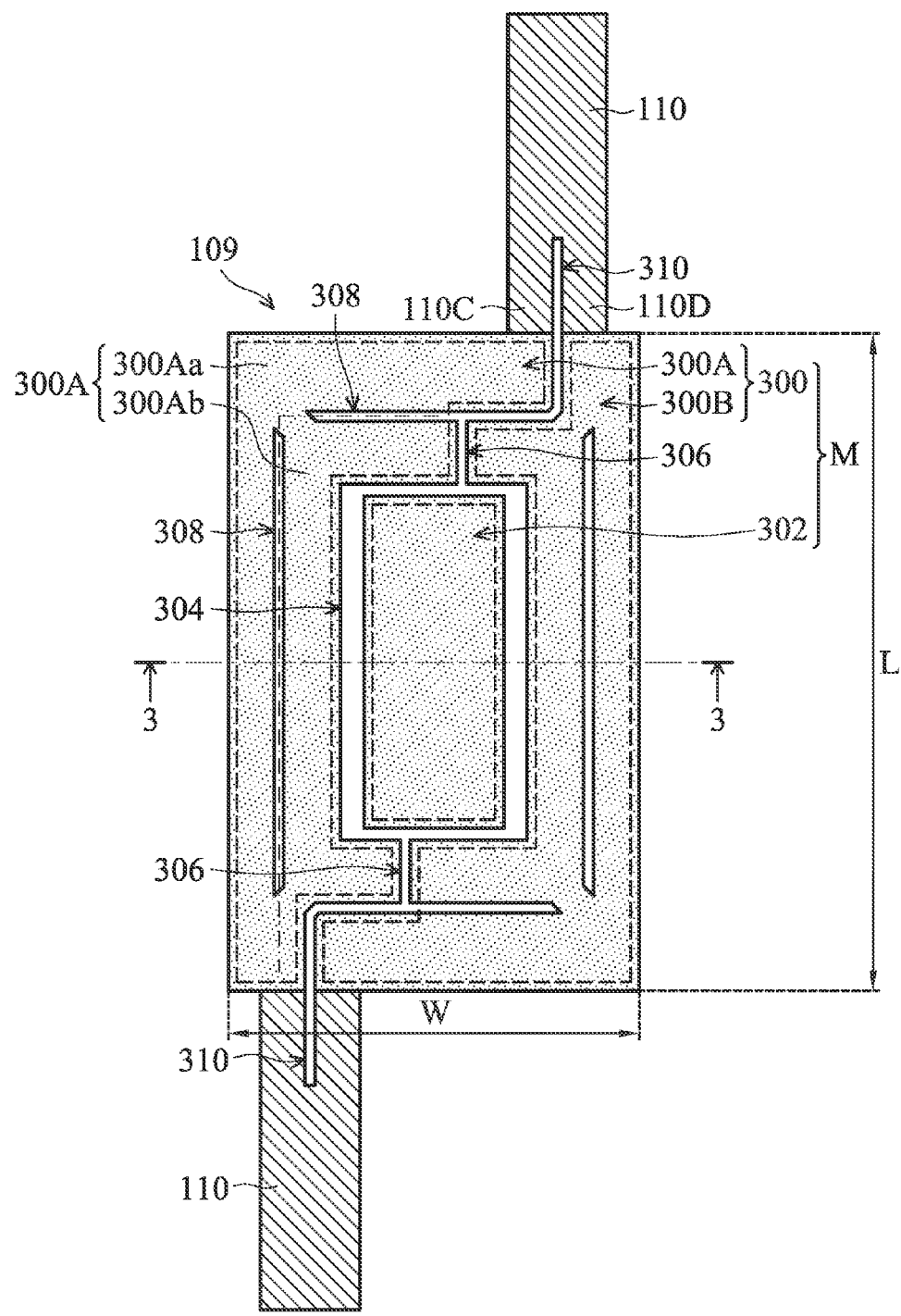
FIG. 7 is a top view of a test pad in accordance with some embodiments of the present disclosure.
Figure 8A:
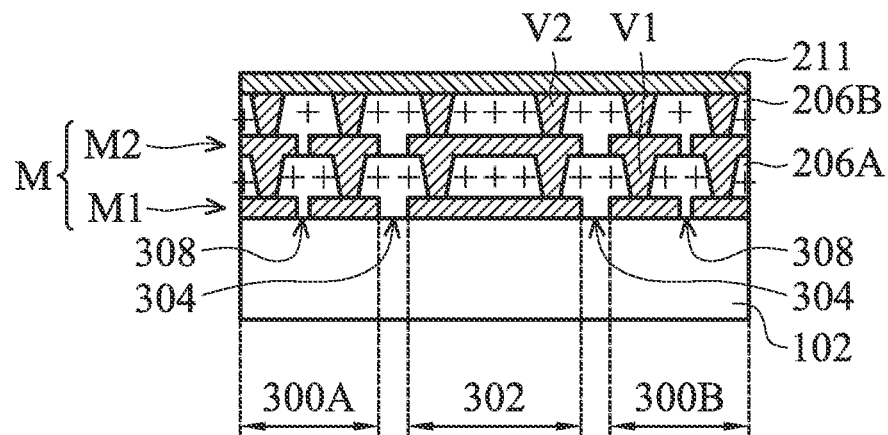
FIGS. 8A-8B are cross-sectional views of the test pad along line 3-3 in FIG. 7.

Referring to FIG. 7 and FIG. 8A, FIG. 7 is a top view of a test pad 109 in accordance with some embodiments of the present disclosure and FIG. 8A is a cross-sectional view of the test pad 109 along line 3-3 in FIG. 7. As shown in FIGS. 7 and 8A, the test pad 109 includes a conductive layer M disposed over a substrate 102, and the conductive layer M comprises a first region 300 and a second region 302. The first region 300 of the conductive layer M is used to transmit the signal between two wires 110. The second region 302 of the conductive layer M is used to contact the probe in the testing step. The first region 300 of the conductive layer M directly contacts the wire 110, whereas the second region 302 of the conductive layer M is separated apart from the first region 300 of the conductive layer M. In other words, the first region 300 of the conductive layer M does not connect or contact the second region 302 of the conductive layer M. For example, the first region 300 of the conductive layer M is separated apart from the second region 302 of the conductive layer M by a main gap 304. In addition, the second region 302 of the conductive layer M is separated apart from the wire 110. In other words, the second region 302 of the conductive layer M does not connect or contact the first region 300 of the conductive layer M and the wire 110. The first region 300 is electrically connected to the second region 302 by another connecting layer through a contact via.

Since the second region 302 of the conductive layer M, which is used to contact the probe in the testing step, is separated apart from the first region 300 of the conductive layer M, which is used to transmit the signal, and the wire 110, the corrosion after the testing step is limited to the second region 302 of the conductive layer M. Therefore, the first region 300 of the conductive layer M and the wire 110 would not be corroded. Accordingly, even if the corrosion happens after the testing step, the patterned test pad 109 of the present disclosure may still transmit signals through the first region 300 of the conductive layer M and the wire 110. Therefore, the patterned test pad 109 may improve the reliability and yield of the display device 100.

In addition, the ratio of the area of the first region 300 to that of the second region 302 of the conductive layer M ranges from about 2 to 1000, for example from about 4 to 10. If the area ratio of the first region 300 to the second region 302 is too large, for example greater than 1000, the area of the second region 302 of the conductive layer M which is used to contact the probe would be too small, such that it would be difficult to perform the testing step. However, if the area ratio of the first region 300 to the second region 302 is too small, for example smaller than 2, the area of the first region 300 of the conductive layer M which is used to transmit the signal would be too small, which in turn increases the resistance. In addition, the size of the test pad 109 may range from about 100 μm to 1000 μm, for example from about 500 μm to 800 μm. The size of the test pad 109 refers to the length L or width W of the test pad 109.

Referring to FIG. 8A, the conductive layer M is disposed over the substrate 102. The conductive layer M may comprise, but is not limited to, a metal layer. The material of the metal layer may include, but is not limited to, a single layer or multiple layers of copper, aluminum, tungsten, gold, chromium, nickel, platinum, titanium, iridium, rhodium, a combination thereof, an alloy thereof, or other metal materials with good conductivity. In other embodiments, the conductive layer M includes a nonmetal material. The conductive layer M may include any conductive material and would suffer a corrosion expansion after being corroded, and the conductive material could be used as the conductive layer M of the embodiments mentioned above. For example, in the embodiment shown in FIG. 8A, the conductive layer M is a double-layer conductive layer, which includes the first conductive layer M1 and the second conductive layer M2. In one embodiment, the materials of the first conductive layer M1 and the second conductive layer M2 are the same. However, in other embodiments, the materials of the first conductive layer M1 and the second conductive layer M2 may be different. An interlayer dielectric (ILD) layer 206A is disposed between the first conductive layer M1 and the second conductive layer M2. The first conductive layer M1 and the second conductive layer M2 have the same pattern, and the corresponding patterns are electrically connected to each other through the via V1 in the interlayer dielectric layer 206A. The material of the interlayer dielectric layer 206A may include, but is not limited to, silicon oxide, silicon nitride, silicon oxynitride, boron phosphorus silicate glass (BPSG), phosphorus silicate glass (PSG), spin-on glass (SOG), or any other suitable dielectric material, or a combination thereof. The material which electrically connects the first conductive layer M1 and the second conductive layer M2 through the via V1 may include, but is not limited to, the material of the first conductive layer M1, the material of the second conductive layer M2, a combination thereof, copper, aluminum, tungsten, doped poly-silicon, or any other suitable conductive material, or a combination thereof.

In addition, in the embodiment shown in FIG. 8A, the first region 300 of the conductive layer M may be electrically connected to the second region 302 of the conductive layer M by a connecting layer 211. Since the connecting layer 211 has a higher anticorrosive ability than the conductive layer, and the first region 300 and the second region 302 are electrically connect by a connecting layer 211 rather than by direct contact, the connecting layer 211 would protect the conductive layer from being corroded by water and oxygen. The material of the connecting layer 211 may include, but is not limited to, transparent conductive material such as indium tin oxide (ITO), tin oxide (TO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxides with higher anticorrosive ability. The connecting layer 211 may be electrically connected to the conductive layer M1 or the conductive layer M2 by the via V2 in the interlayer dielectric layer 206B to electrically connect the first region 300 of the conductive layer M to the second region 302 of the conductive layer M.

Figure 8B:
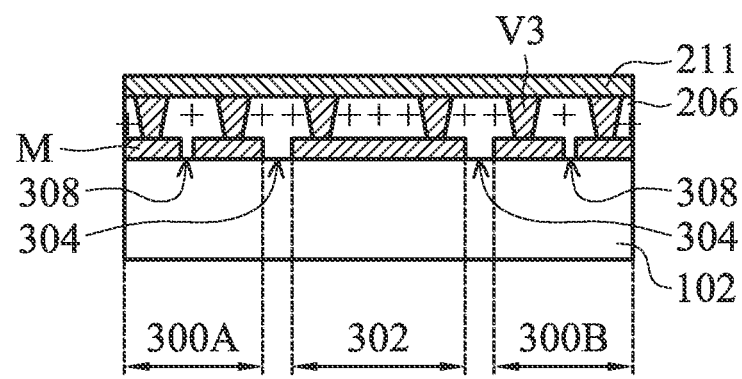

In addition, the conductive layer M may also be a single-layer conductive layer. As shown in FIG. 8B, only one single conductive layer M is disposed over the substrate 102, and the first region 300 of the conductive layer M may be electrically connected to the second region 302 of the conductive layer M by the connecting layer 211 through the via. For example, the connecting layer 211 may be electrically connected to the conductive layer M by the via V3 in the interlayer dielectric layer 206 to electrically connect the first region 300 of the conductive layer M to the second region 302 of the conductive layer M.

Referring to FIG. 7, in the embodiment shown in FIG. 7, the main gap 304 may surround the second region 302 of the conductive layer M. The width of the main gap 304 may range from about 10 μm to 100 μm, for example from about 20 μm to 40 μm. Alternatively, the ratio of the width of the main gap 304 to the width W of the test pad 109 may range from about 0.01 to 0.25, for example from about 0.025 to 0.1. If the width of the main gap 304 is too large, for example if the width of the main gap 304 is larger than 100 μm or the ratio of the width of the main gap 304 to the width W of the test pad 109 is larger than 0.25, the main gap 304 would occupy too much area of the test pad 109, which in turn reduces the area of the conductive layer M and increases the resistance. However, if the width of the main gap 304 is too small, for example if the width of the main gap 304 is smaller than 10 μm or the ratio of the width of the main gap 304 to the width W of the test pad 109 is smaller than 0.01, the main gap 304 could not effectively prevent the first region 300 of the conductive layer M from being corroded. For example, when the width of the main gap 304 is too small, if the probe contacts the main gap 304 due to shifting, the first region 300 of the conductive layer M would probably be exposed such that the first region 300 of the conductive layer M would be corroded.

In addition, the first region 300 of the conductive layer M also surrounds or encloses the second region 302 of the conductive layer M. The first region 300 of the conductive layer M may be divided into a plurality of sections which are separated apart from each other by one or more first gaps 306. In other words, the plurality of sections such as the sections 300A and 300B shown in FIG. 7 does not contact each other. The plurality of sections 300A and 300B which are separated apart from each other may further improve the reliability and yield of the display device 100. In particular, in the testing step, the probe may contact the first region 300 of the conductive layer M due to shifting. Therefore, the first region 300 of the conductive layer M may also be corroded after the testing step. The plurality of sections 300A and 300B which are separated apart from each other may limit the corrosion in the section touched by the probe, and the signal may still be transmitted by other sections of the first region 300 of the conductive layer M which are not corroded. For example, if the probe contacts section 300A, since sections 300A and 300B are separated apart from each other, the corrosion is limited to section 300A, and the signal can still be transmitted by section 300B, which is not corroded. Therefore, dividing the first region 300 of the conductive layer M into a plurality of sections which are separated apart from each other by one or more first gaps 306 may further improve the reliability and yield of the display device 100.

The width of the first gap 306 may range from about 3 μm to 50 μm, for example from about 10 μm to 20 μm. Alternatively, the ratio of the width of the first gap 306 to the width W of the test pad 109 may range from about 0.0033 to 0.1, for example from about 0.01 to 0.02. If the width of the first gap 306 is too large, for example if the width of the first gap 306 is larger than 50 μm or the ratio of the width of the first gap 306 to the width W of the test pad 109 is larger than 0.1, the first gap 306 would occupy too much area of the test pad 109, which in turn reduces the area of the conductive layer M and increases the resistance. However, if the width of the first gap 306 is too small, for example if the width of the first gap 306 is smaller than 3 μm or the ratio of the width of the first gap 306 to the width W of the test pad 109 is smaller than 0.0033, the first gap 306 could not effectively separate the sections 300A and 300B.

In addition, the plurality of sections 300A and 300B in the first region 300, which are separated apart from each other, may further include one or more in-section gaps 308. The in-section gaps 308 may divide the sections 300A and 300B into a plurality of sub-sections. The sub-sections are substantially separated apart from each other, and the sub-sections connect to each other only by a small part or a small portion of the sub-sections. For example, section 300A may be divided into a plurality of sub-sections 300Aa and 300Ab by a plurality of in-section gaps 308. The sub-sections 300Aa and 300Ab are substantially separated apart from each other, and the sub-sections 300Aa and 300Ab physically connect to each other only by a small part or a small portion located at the upper left and lower left in the figure. The plurality of the sub-sections 300Aa and 300Ab which are substantially separated apart from each other may further improve the reliability and yield of the display device 100. For example, if the probe contacts the sub-section 300Ab, since the sub-sections 300Aa and 300Ab connect to each other only by a small part or a small portion, the corrosion is limited to sub-section 300Ab. Even if the sub-section 300Ab is damaged due to the corrosion, the signal may still be transmitted by the sub-section 300Aa which are not corroded. Therefore, dividing the plurality of sections 300A and 300B into a plurality of sub-sections such as sub-sections 300Aa and 300Ab by the in-section gaps 308 may further improve the reliability and yield of the display device 100.

The width of the in-section gap 308 may range from about 3 μm to 50 μm, for example from about 10 μm to 20 μm. Alternatively, the ratio of the width of the in-section gap 308 to the width W of the test pad 109 may range from about 0.0033 to 0.1, for example from about 0.01 to 0.02. If the width of the in-section gap 308 is too large, for example if the width of the in-section gap 308 is larger than 50 μm or the ratio of the width of the in-section gap 308 to the width W of the test pad 109 is larger than 0.1, the in-section gap 308 would occupy too much area of the test pad 109, which in turn reduces the area of the conductive layer M and increases the resistance. However, if the width of the in-section gap 308 is too small, for example if the width of the in-section gap 308 is smaller than 3 μm or the ratio of the width of the in-section gap 308 to the width W of the test pad 109 is smaller than 0.0033, the sub-sections 300Aa and 300Ab would be too close and the in-section gap 308 could not effectively prevent corrosion.

Referring to FIG. 7, the material of the wire 110 may include, but is not limited to, a single layer or multiple layers of copper, aluminum, tungsten, gold, chromium, nickel, platinum, titanium, iridium, rhodium, a combination thereof, an alloy thereof, or other metal materials with good conductivity. In addition, the wire 110 may further include one or more in-wire gaps 310. In one embodiment, at least one in-wire gap 310 connects to at least one first gap 306. The in-wire gap 310 may further improve the reliability and yield of the display device 100. In particular, if the corrosion extends from the sections 300 of the first region 300 to the first-section wire 110C, the in-wire gap 310 may limit the corrosion to the first-section wire 110C, and the second-section wire 110D would not be corroded. Accordingly, since the wire 110 would not be corroded completely, the in-wire gap 310 may further improve the reliability and yield of the display device 100. In other embodiments, the connecting layer 211 may also be disposed above or overlapped with the wire 110.

The width of the in-wire gap 310 may range from about 3 μm to 50 μm, for example from about 10 μm to 20 μm. Alternatively, the ratio of the width of the in-wire gap 310 to the width of the wire 110 may range from about 0.02 to 0.5, for example from about 0.05 to 0.2. If the width of the in-wire gap 310 is too large, for example if the width of the in-wire gap 310 is larger than 50 μm or the ratio of the width of the in-wire gap 310 to the width of the wire 110 is larger than 0.5, the risk of an open circuit occurring in the wire 110 would increase due to the overly large size of the in-wire gap 310. However, if the width of the in-wire gap 310 is too small, for example if the width of the in-wire gap 310 is smaller than 3 μm or the ratio of the width of the in-wire gap 310 to the width of the wire 110 is smaller than 0.02, the in-wire gap 310 would not effectively prevent the corrosion from extending between the first-section wire 110C and the second-section wire 110D at the opposite sides of the in-wire gap 310. Alternatively, the ratio of the length of the in-wire gap 310 to the length L of the test pad 109 may range from about 0.03 to 3. The length of the in-wire gap 310 may be as short as 3 μm. Alternatively, the ratio of the length of the in-wire gap 310 to the length L of the test pad 109 may be as small as 0.03. The length of the in-wire gap 310 may be as long as the length of the wire 110 in the out lead bonding region 115. If the length of the in-wire gap 310 is too short, for example if the length of the in-wire gap 310 being shorter than 3 μm or the ratio of the length of the in-wire gap 310 to the length L of the test pad 109 is smaller than 0.03, the in-wire gap 310 could not effectively separate the first-section wire 110C and the second-section wire 110D. However, length of the in-wire gap 310 cannot be longer than the length of the wire 110 in the out lead bonding region 115.

It should be noted that the exemplary embodiment set forth in FIG. 7 is merely for the purpose of illustration. In addition to the embodiment set forth in FIG. 7, the test pad could have other patterns as shown in FIGS. 9-12. The inventive concept and scope are not limited to the exemplary embodiment shown in FIG. 7.

Figure 9:
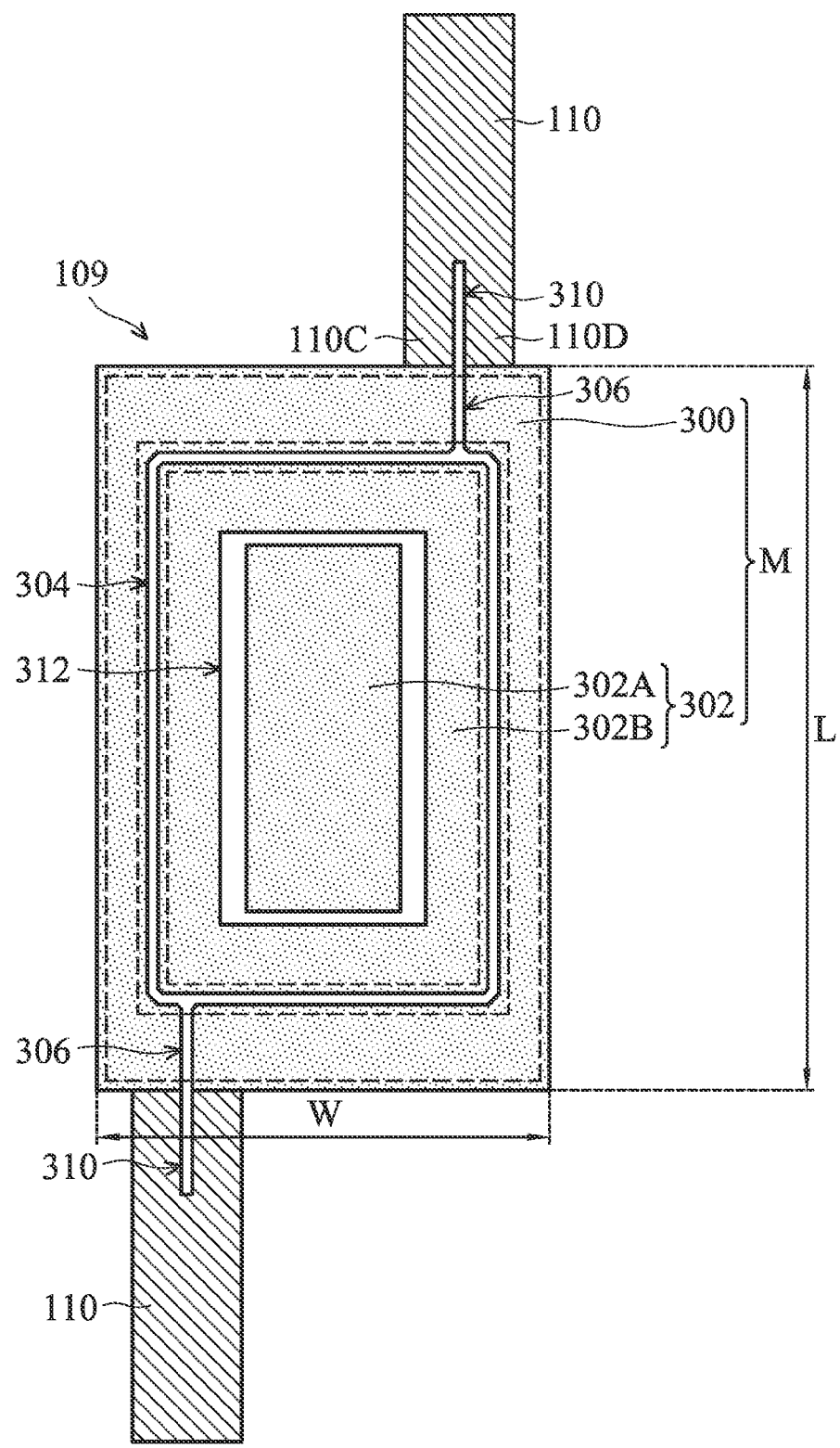
FIG. 9 is a top view of a test pad in accordance with another embodiment of the present disclosure.

Referring to FIG. 9, which is a top view of a test pad in accordance with another embodiment of the present disclosure. The difference between the embodiments shown in FIGS. 7 and 9 is that the second region 302 of the conductive layer M is also divided into a plurality of sections 302A and 302B which are separated apart from each other by one or more second gaps 312. In other words, the plurality of sections 302A and 302B do not directly contact each other. In addition, in the embodiment shown in FIG. 9, the first region 300 of the conductive layer M does not include an in-section gap.

The plurality of sections 302A and 302B which are separated apart from each other may further improve the reliability and yield of the display device 100. For example, when the probe touches the sections 302A, the corrosion is limited to section 302A, and the section 302B which is not corroded could still transmit signal through the via and the connecting layer. Therefore, the plurality of sections 302A and 302B may further improve the reliability and yield of the display device 100 and may further reduce the resistance.

The width of the second gap 312 may range from about 10 μm to 100 μm, for example from about 30 μm to 50 μm. Alternatively, the ratio of the width of the second gap 312 to the width W of the test pad 109 may range from about 0.01 to 0.25, for example from about 0.05 to 0.1. If the width of the second gap 312 is too large, for example if the width of the second gap 312 is larger than 100 μm or the ratio of the width of the second gap 312 to the width W of the test pad 109 is larger than 0.25, the second gap 312 would occupy too much area of the test pad 109, which in turn reduces the area of the conductive layer M and increases the resistance. However, if the width of the second gap 312 is too small, for example if the width of the second gap 312 is smaller than 10 μm or the ratio of the width of the second gap 312 to the width W of the test pad 109 is smaller than 0.01, the second gap 312 could not effectively separate the sections 302A and 302B.

Figure 10:
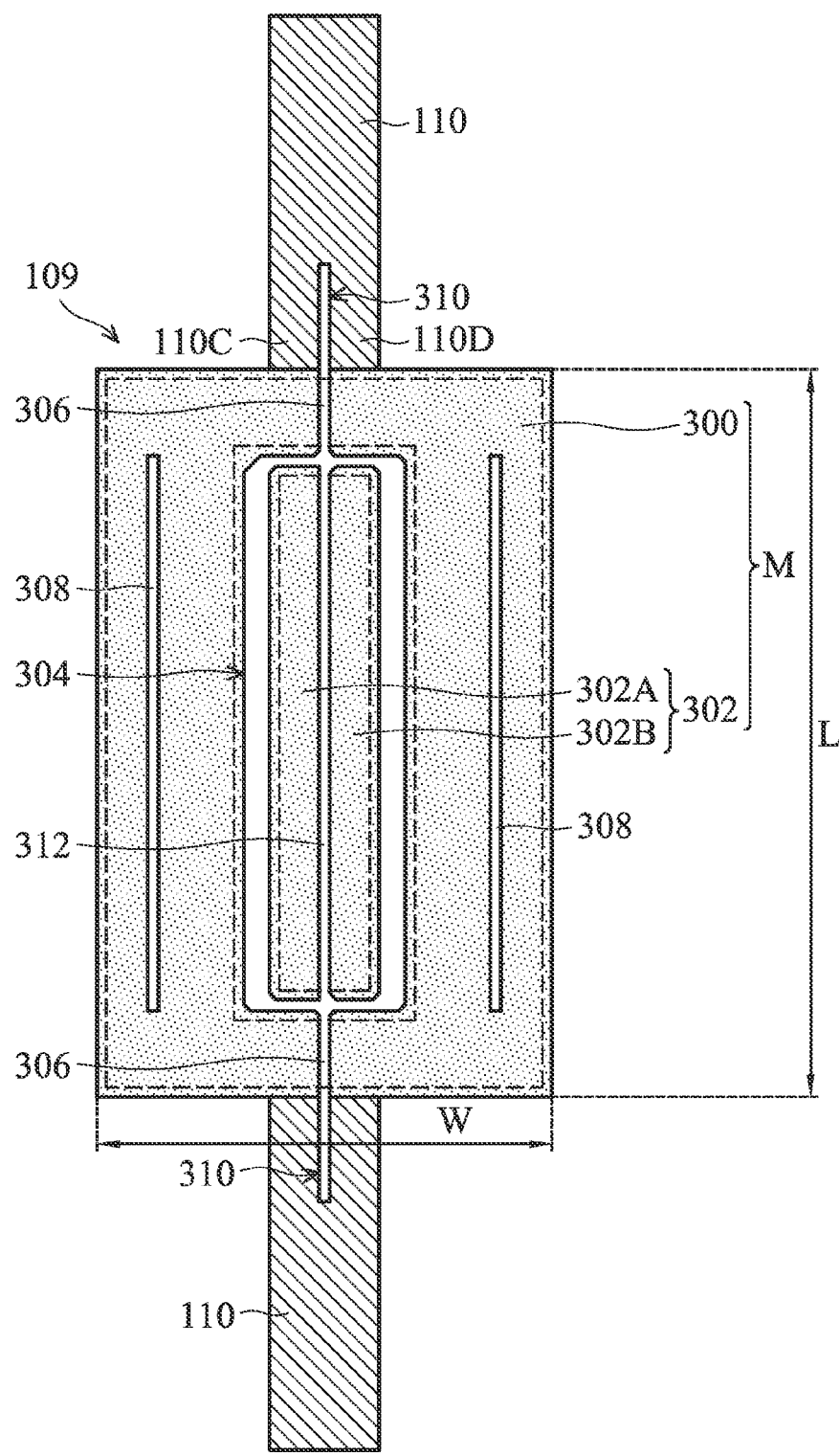
FIG. 10 is a top view of a test pad in accordance with another embodiment of the present disclosure.

Referring to FIG. 10, which is a top view of a test pad in accordance with another embodiment of the present disclosure. In the embodiment shown in FIG. 10, the second region 302 of the conductive layer M is also divided into a plurality of sections 302A and 302B which are separated apart from each other by one or more second gaps 312. The difference between the embodiment shown in FIG. 10 and the embodiment shown in FIG. 9 is that the second gap 312 of this embodiment is aligned with the first gap 306 and the in-wire gap 310.

Figure 11:
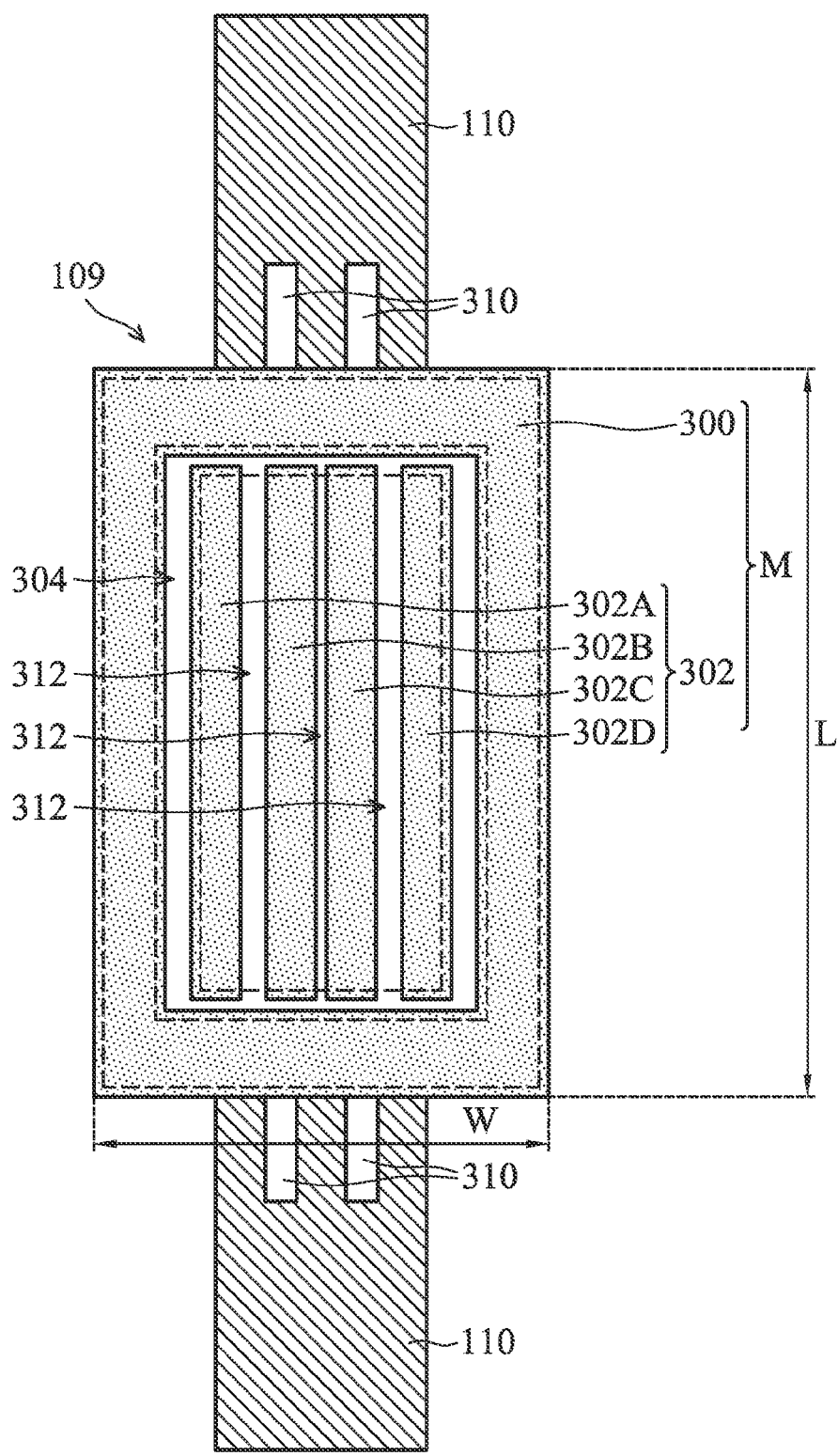
FIG. 11 is a top view of a test pad in accordance with another embodiment of the present disclosure.

Referring to FIG. 11, which is a top view of a test pad in accordance with another embodiment of the present disclosure. The difference between the embodiment shown in FIG. 11 and the embodiment shown in FIG. 10 is that The second region 302 of the conductive layer M is divided into four sections 302A, 302B, 302C and 302D which are separated apart from each other by three second gaps 312. In addition, the wire 110 includes two in-wire gaps 310, and The first region 300 of the conductive layer M does not include the first gap.

Figure 12:
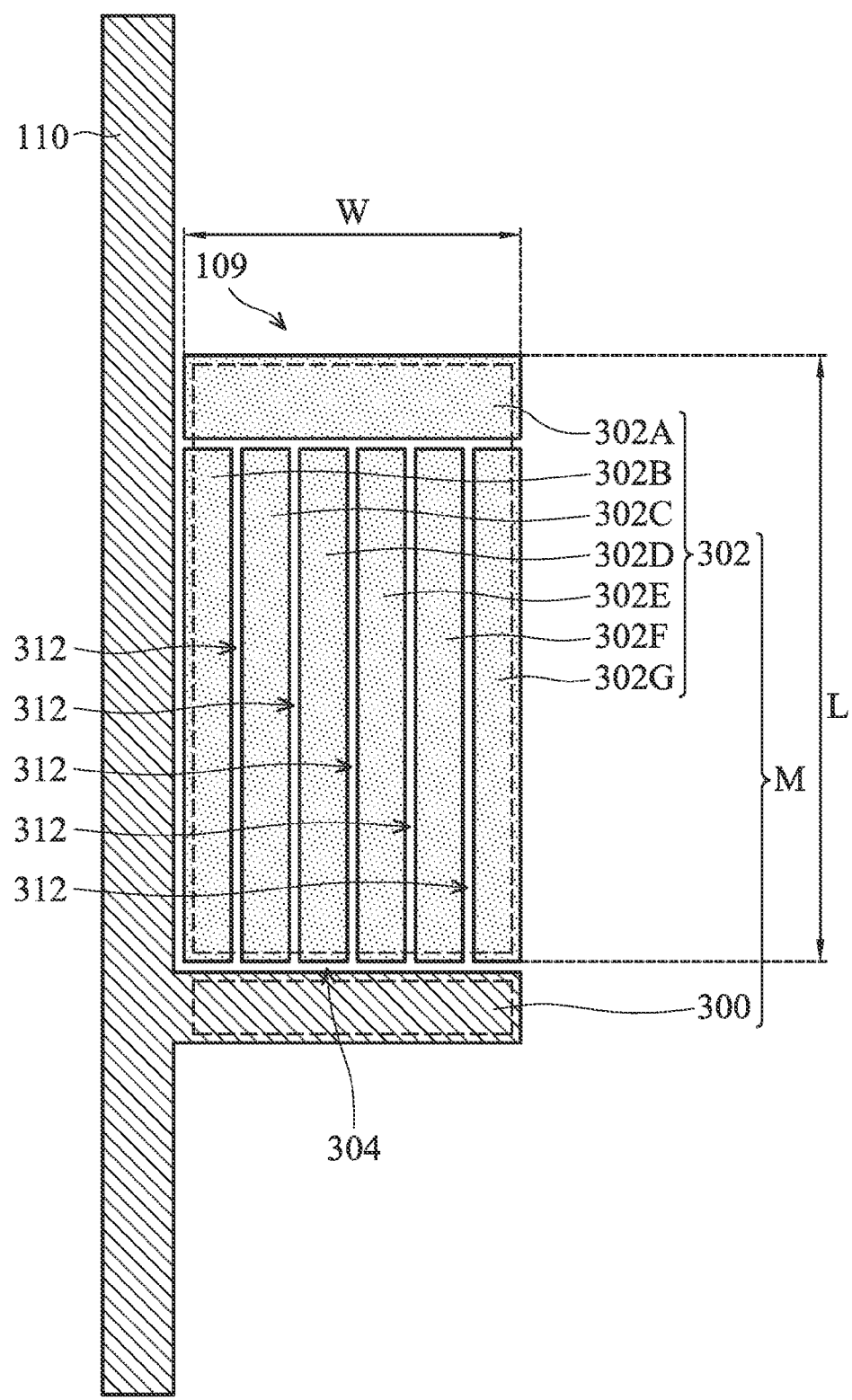
FIG. 12 is a top view of a test pad in accordance with another embodiment of the present disclosure.

Referring to FIG. 12, which is a top view of a test pad in accordance with another embodiment of the present disclosure. The difference between the embodiment shown in FIG. 12 and the embodiments shown in FIGS. 7 and 9-11 is that the first region 300 of the conductive layer M does not surround or enclose the second region 302 of the conductive layer M. Instead, the first region 300 of the conductive layer M is disposed at one side of the second region 302 of the conductive layer M. In addition, the second region 302 of the conductive layer M is divided into seven sections 302A, 302B, 302C, 302D, 302E, 302F and 302G which are separated apart from each other by six second gaps 312. In other embodiments, the shape of the second gap 312 is not limited to a linear shape, and the division manner is not limited to that shown in the above embodiments. Any division manner which may divide. The second region 302 of the conductive layer M into a plurality of the sections which are separated apart from each other may be used in the present disclosure.

In summary, by electrically connecting the driving unit to the gate-driving circuit through the test pad, the present disclosure may reduce the area occupied by the wire in the driving unit. Therefore, the problem of insufficient area for the wire in the driving unit happened as the resolution of the display panel is enhanced may be solved. In addition, the present disclosure utilizes the patterned test pad to limit the corrosion happened after the testing step in a portion of the patterned test pad, which in turn improves the reliability and yield of the display device.

In addition, the disclosure further provides a display device that has a fanout area with circuits that are integrated to a high degree in order to reduce the space occupied by the fanout area. Therefore, the display device can have a high resolution under the premise that the size of the display device is fixed.

In addition, according to an embodiment of the disclosure, the display device of the disclosure can further include a first conductive loop, having a plurality of conductive blocks, outside the display region, in order to prevent the display device from damage caused by electrostatic discharge during the process.

Moreover, according to an embodiment of the disclosure, the display device of the disclosure can further include a second conductive loop outside the display region, wherein a sealant is disposed over the second conductive loop and close to the peripheral boundary of the display device, in order to achieve a high electrostatic discharge ability.

Figure 13:
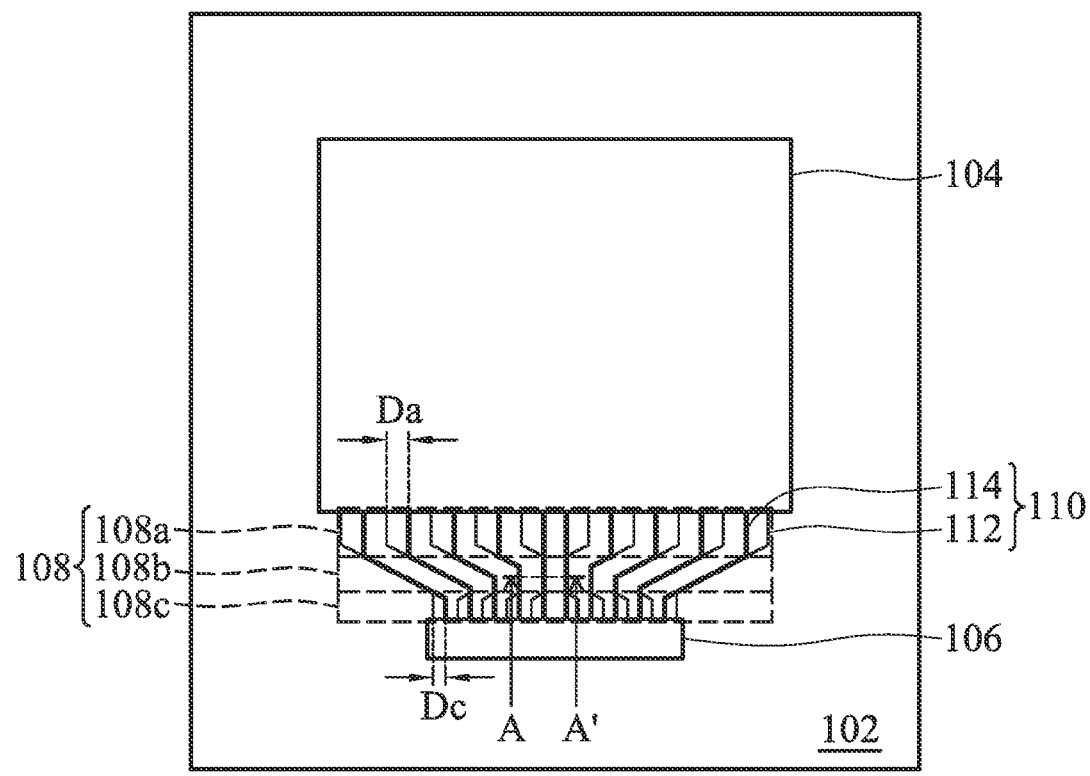
FIG. 13 is a top view of a display device according to an embodiment of the disclosure.

FIG. 13 shows a top-view of a display device according to an embodiment of the disclosure. The display device 100 includes a display region 104 and a driving element 106 disposed on a substrate 102. The display device 100 can be a liquid-crystal display (such as thin film transistor liquid-crystal display), or an organic electroluminescent display (such as active full-color organic electroluminescent display). The display region 104 has a plurality of pixels (not shown), and the driving element 106 is electrically connected to the display region 104 via a plurality of signal line pairs 110, in order to provide input to the pixels of the display region 110 so that the display device can display images. In particular, the display region 104 is separated from the driving element 106 by a fanout area 108, and a plurality of signal line pairs 110 are disposed on the fanout area 108. At least one of the signal line pairs 110 includes a first conductive line 112 and a second conductive line 114, wherein the first conductive line 112 and the second conductive line 114 are electrically isolated from each other. The first conductive line 112 and the second conductive line 114 transmit different signals. For example, each of the pixels disposed in the display region 104 can have at least three sub-pixels (such as red sub-pixel, blue sub-pixel, and green sub-pixel; or, red sub-pixel, blue sub-pixel, green sub-pixel, and white sub-pixel), and the various signals produced by the driving element 106 are transmitted to the sub-pixels via the first conductive lines 112 and second conductive lines 114. In addition, in the fanout area 108, at least a part of the first conductive line 112 overlaps with the second conductive line 114.

As still shown in FIG. 13, the fanout area 108 can be defined as a first circuit area 108a, a second circuit area 108b, and a third circuit area 108c, wherein the first circuit area 108a is adjacent to the display region 104, the third circuit area 108c is adjacent to the driving element 106, and the second circuit area 108b area disposed between the first circuit area 108a and third circuit area 108c.

According to an embodiment of the disclosure, in the first circuit area 108a, any the first conductive line 112 and the adjacent second conductive line 114 are separated by a distance (minimum horizontal distance) Da. Namely, the first conductive block 112 and the second conductive block 114 adjacent to the first conductive block 112 are separated from each other. In the third circuit area 108c, any the first conductive line 112 and the adjacent second conductive line 114 are separated by a distance (minimum horizontal distance) Dc. In particular, the distance Da (the distance between the first conductive block 112 and the second conductive block 114 adjacent to the first conductive block 112) can be from 3 to 40 µm, the distance Dc can be from 3 µm to 18 µm, and the distance Da is longer than the distance Dc.

Figure 14:
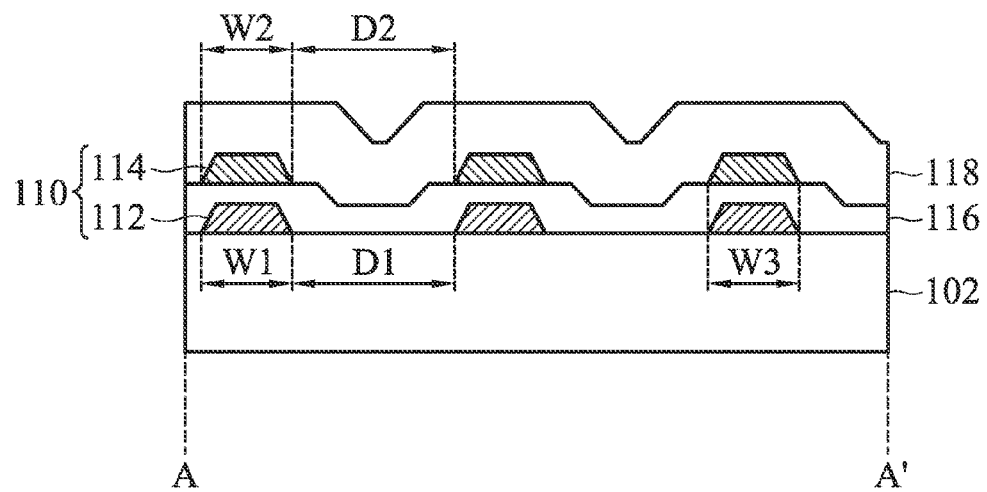
FIG. 14A is a cross-sectional view of the display device shown in FIG. 13 along the line A-A'.
FIGS. 14B and 14C are cross-sectional views of the display devices according to some embodiments of the disclosure along the line A-A' of FIG. 13.
Figure 14:
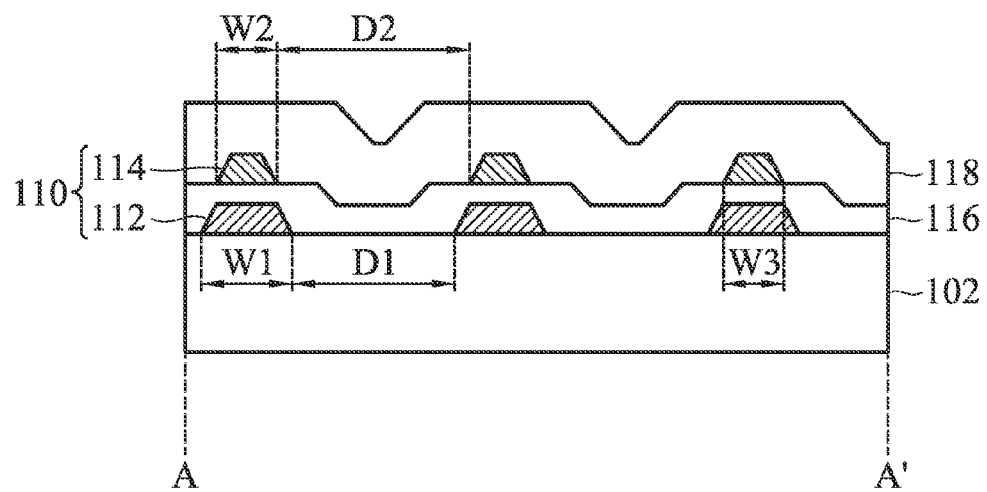

FIG. 14A shows a cross-sectional view of FIG. 13 along line A-A'. As shown in FIG. 14A, in the second circuit area 108b, the first conductive line 112 and the second conductive line 114 of the same signal line pair 110 can partially overlap each other. As a result, the horizontal projection area of the first conductive line 112 and the second conductive line 114 can be reduced, and the integration degree of the fanout area 108 can be increased.

As shown in FIG. 14A, the first conductive line 112 can be disposed on the substrate 102. A dielectric layer 116 can be disposed on the substrate 102 to cover the first conductive line 112. The second conductive line 114 can be disposed on the dielectric layer 116, and the first conductive line 112 can overlap with the second conductive line 114. A passivation layer 118 can be disposed on the dielectric layer 116 to cover the second conductive line 114. In particular, the substrate 102 can be quartz, glass, silicon, metal, plastic, or ceramic. Suitable materials for the first conductive lines 112 and the second conductive lines 114 include a single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as: aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. Furthermore, the first conductive line 112 and the second conductive line 114 can be made of the same or different material. The dielectric layer 116 can be silicon nitride, silicon oxide, silicon oxynitride, silicon carbide, aluminum oxide, or a combination thereof. The passivation layer 118 can be made of organic insulating materials (such as photosensitive resins) or inorganic insulating materials (such as silicon nitride, silicon oxide, silicon oxynitride, silicon carbide, aluminum oxide, or a combination thereof), in order to isolate the first conductive line 112 and the second conductive line 114 from air and moisture. In addition, according to an embodiment of the disclosure, the first conductive line 112 and the second conductive line 114 have tapered sidewalls, as shown in FIG. 14A. In particular, the tapered sidewall of the first conductive line 112 or the second conductive line 114 has an inclination angle of 15 to 90° from horizontal. Further, the inclination angle of the first conductive line 112 can be equal to or different from that of the second conductive line 114.

According to an embodiment of the disclosure, the width W1 of the first conductive line 112 can be from 2 to 10 µm, the width W2 of the second conductive line 114 can be from 2 to 10 µm, and the width W1 can be equal to the width W2 (as shown in FIG. 14A). Further, the width W1 of the first conductive line 112 can be different from the width W2 of the second conductive line 114 (as shown in FIG. 14B). Namely, the ratio of the width W1 of the first conductive line 112 to the width W2 of the second conductive line 114 is from 1 to 5. For example, as shown in FIG. 14B, the width W1 of the first conductive line 112 can be larger than the width W2 of the second conductive line 114. In addition, as shown in FIGS. 14A and 14B, the second conductive line 114 can completely overlap with the first conductive line 112 (i.e., the horizontal projection of the second conductive line 114 can completely overlap the horizontal projection of the first conductive line 112).

According to an embodiment of the disclosure, in the second circuit area 108b, any two adjacent first conductive lines 112 are separated by a distance D1 (i.e., the minimum horizontal distance between the two adjacent first conductive lines 112 in the second circuit area 108b). Further, in the second circuit area 108b, any two adjacent second conductive lines 114 are separated by a distance D2 (i.e., the minimum horizontal distance between the two adjacent second conductive lines 114 in the second circuit area 108b). In particular, the distance D1 can be from 2 to 30 µm, and the distance D2 can be from 2 to 30 µm.

According to an embodiment of the disclosure, in the second circuit area 108b, the sum (W1+D1) of the width W1 of the first conductive line 112 and the distance D1 can be equal to the sum (W2+D2) of the width W2 of the second conductive line 114 and the distance D2. In addition, the ratio (D1/(W1+D1)) of the distance D1 and the sum of the distance D1 and the width W1 can be from 0.1 to 0.66. When the ratio (D1/(W1+D1)) is greater than or equal to 0.1, a sealant (not shown) subsequently formed within the second circuit area 108b is apt to be completely cured after a curing process (irradiating an energy from the substrate 102 side). On the other hand, when the ratio (D1/(W1+D1)) is less than or equal to 0.66, the integration degree of conductive lines of the second circuit area 108b can be increased.

According to embodiments of the disclosure, the overlapping portion of the first conductive line 112 and the second conductive line 114 (i.e., the overlapping portion of the horizontal projection of the first conductive line 112 and the horizontal projection of the second conductive line 114) has a width W3 (i.e., the minimum horizontal width). Further, the ratio (W3/W1) of the width W3 and the width W1 of the first conductive line 112 is from 0.3 to 1.

Figure 14C:
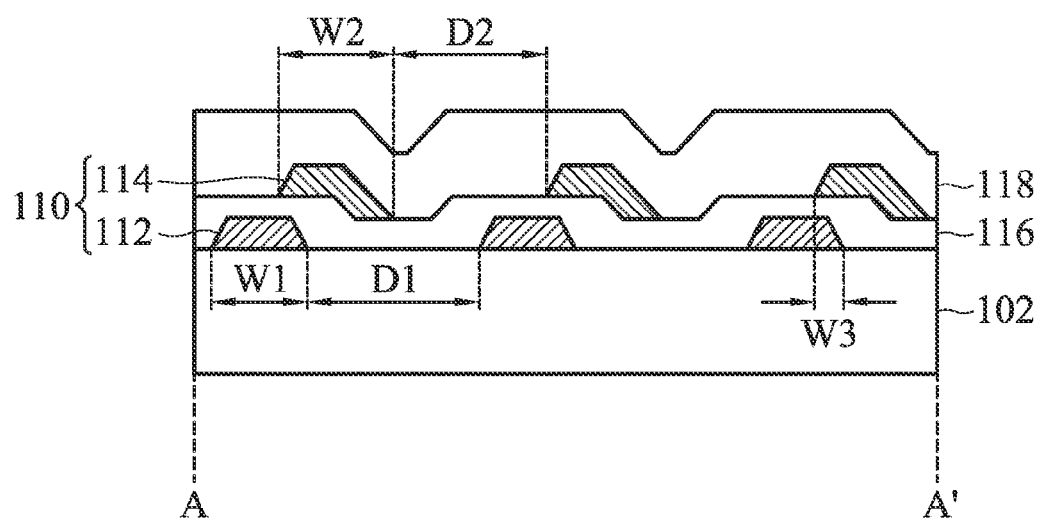

With respect to the signal line pair 110 in the second circuit area 108b, at least a part of the first conductive line 112 can overlap with the second conductive line 114 (i.e., at least a part of the horizontal projection of the first conductive line 112 can overlap the horizontal projection of the second conductive line 114), as shown in FIG. 14C. Herein, the relationship between the width W1 of the first conductive line 112, the width W2 of the second conductive line 114, and the width W3 can be defined by the following equation:

$$(W1+W2-W3)/W1 \geq 1$$

Figure 15:
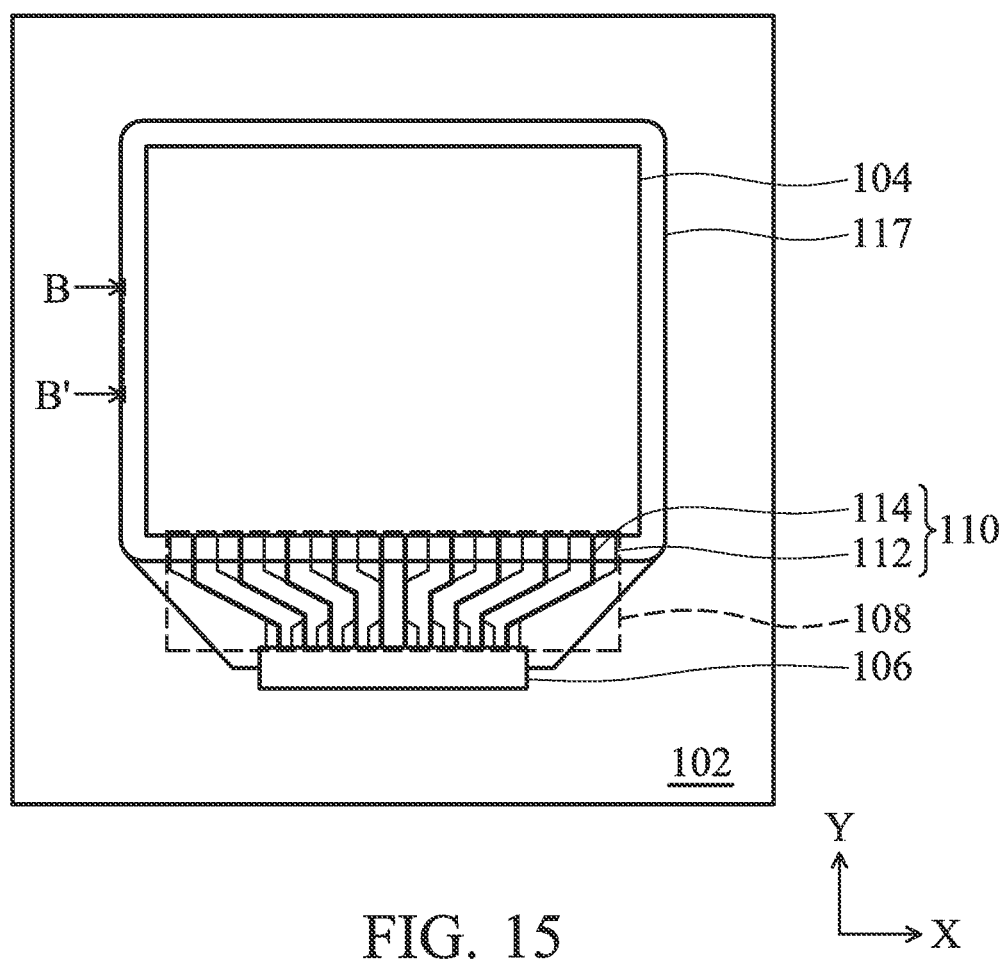
FIG. 15 is a top view of a display device according to another embodiment of the disclosure.

FIG. 15 is a top-view of a display device 100 according to an embodiment of the disclosure. Besides the display region 104, the driving element 106, and the fanout area 108, the display device 100 further includes a first conductive loop 117 disposed outside the display region 104. As shown in FIG. 15, the first conductive loop 117 can be disposed on the substrate 102 and surround the display region 104. Further, the first conductive loop 117 can be electrically connected to the driving element 106, and the driving element 106 can provide a voltage signal to the first conductive loop 117 in order to force the first conductive loop 117 to generate a reference voltage. Since the first conductive loop 117 would overlap with the signal line pairs 110 in the fanout area 108, another conducting layer can be used as a substitute for the first conductive loop 117 or the signal line pairs 110 in order to avoid contact between the first conductive loop 117 and the signal line pairs 110.

Figure 16A:
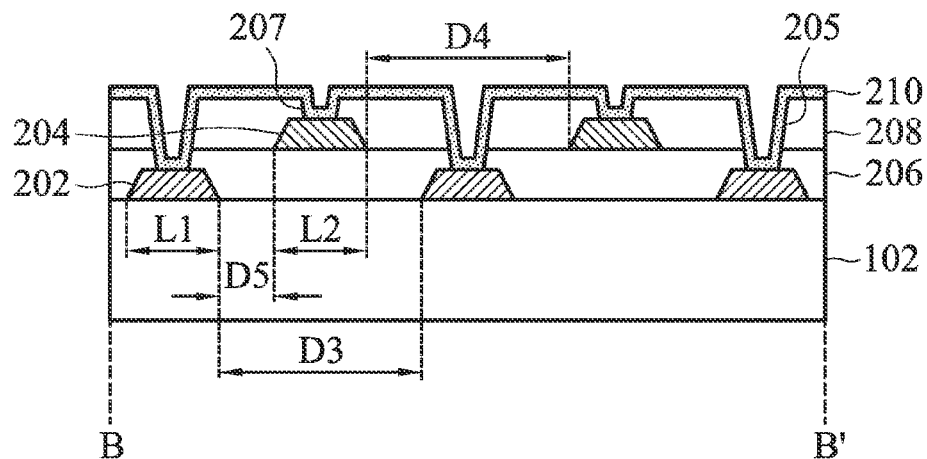
FIG. 16A is a cross-sectional view of the display device shown in FIG. 15 along the line B-B'.

According to an embodiment of the disclosure, at least a part of the first conductive loop 117 includes a plurality of first conductive blocks 202 and a plurality of second conductive blocks 204. The first conductive blocks 202 and the second conductive blocks 204 are electrically connected to each other. FIG. 16A shows a cross-sectional view of the display device 100 of FIG. 15 along line B-B'. According to an embodiment of the disclosure, the part of the first conductive loop 117 including the plurality of first conductive blocks 202 and the plurality of second conductive blocks 204 can be disposed on the two opposite sides of the display region 104, and the part of the first conductive loop 117 can be perpendicular to a first axis X (i.e. parallel to a second axis Y). In an embodiment of the disclosure, since there are a plurality of data lines (not shown) disposed on the two opposite sides of the display region 104 corresponding to the first axis X (i.e. the plurality of data lines perpendicular to the first axis X), the part of the first conductive loop 117 including the plurality of first conductive blocks 202 and the plurality of second conductive blocks 204 is not apt to be disposed parallel to the first axis X. In some embodiments of the disclosure, the part of the first conductive loop 117 including the plurality of first conductive block 202 and the plurality of second conductive block 204 can be also disposed on the two opposite sides of the display region 104 and parallel to a first axis X.

As shown in FIG. 16A, the plurality of first conductive blocks 202 can be disposed on the substrate 102. A dielectric layer 206 can be disposed on the substrate 102 to cover the first conductive blocks 202. The plurality of second conductive blocks 204 can be disposed on the dielectric layer 206. A passivation layer 208 can be disposed on the dielectric layer 206 to cover the second conductive blocks 204. In addition, a plurality of first via holes 205 pass through the dielectric layer 206 and the passivation layer 208, exposing the first conductive block 202. A plurality of second via holes 207 pass through the passivation layer 208, exposing the second conductive block 204. A conducting layer 210 can be disposed on the passivation layer 208 to fill into the first via hole 205 and the second via hole 207, resulting in the plurality of first conductive blocks 202 and the plurality of second conductive blocks 204 being electrically connected to each other via the conducting layer 210.

According to an embodiment of the disclosure, the first conductive block 202 and the second conductive block 204 can be a made of single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as: aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. Further, the materials of first conductive blocks 202 and second conductive blocks 204 can be the same or different. According to an embodiment of the disclosure, the first conductive blocks 202 and the first conductive line 112 can be formed in the same process and made of the same material; and/or, the second conductive blocks 204 and the second conductive line 114 can be formed in the same process and made of the same material. The dielectric layer 206 can be silicon nitride, silicon oxide, silicon oxynitride, silicon carbide, aluminum oxide, or a combination thereof. Further, the dielectric layer 206 and the dielectric layer 116 can be formed in the same process and made of the same material. The passivation layer 208 can be organic insulating materials (such as photosensitive resins) or inorganic insulating materials (such as silicon nitride, silicon oxide, silicon oxynitride, silicon carbide, aluminum oxide, or a combination thereof). The passivation layer 208 and the passivation layer 118 can be formed in the same process and made of the same material. In addition, the conducting layer 210 can be a single-layer or multilayer transparent conducting layer, and the material of the conducting layer 210 can be ITO (indium tin oxide), IZO (indium zinc oxide), AZO (aluminum zinc oxide), ZnO (zinc oxide), tin oxide, indium oxide, or a combination thereof.

As still shown in FIG. 16A, in order to prevent the display device 100 from damage caused by electrostatic discharge during the fabrication of the display device, the first conductive block 202 can have a length L1 between 10 and 10000 μm, and the second conductive block 204 can have a length L2 between 10 and 10000 μm. In addition, any two adjacent first conductive blocks 202 are separated by a distance D3, any two adjacent second conductive blocks 204 are separated by a distance D4, and any two adjacent first and second conductive blocks 202 and 204 are separated by a distance D5. In particular, the distance D3 is from 16 to 100 μm, the distance D4 is from 16 to 100 μm, and the distance D5 is from 3 to 40 μm.

Figure 16B:
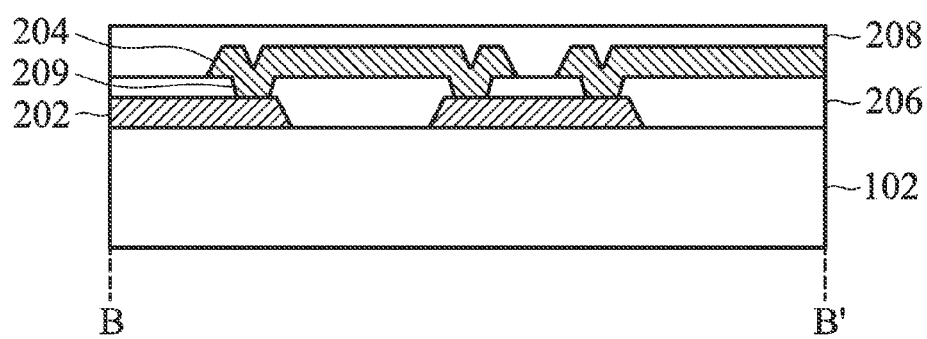
FIGS. 16B and 16C are cross-sectional views of the display devices according to some embodiments of the disclosure along the line B-B' of FIG. 15.

According to another embodiment of the disclosure, any two adjacent first conductive blocks 202 can be electrically connected to each other via the second conductive block 204 adjacent to the two adjacent first conductive blocks 202. As shown in FIG. 16B, the plurality of first conductive blocks 202 can be disposed on the substrate 102. The dielectric layer 206 can be disposed on the substrate 102 to cover the first conductive block 202. A plurality of third via holes 209 pass through the dielectric layer 206 exposing the first conductive block 202. The plurality of second conductive blocks 204 can be disposed on the dielectric layer 206 to fill into the third via hole 209, forcing the second conductive block 204 to overlap with the two first conductive block 202 adjacent to the second conductive block 204. Therefore, the first conductive blocks 202 and the second conductive blocks 204 can be electrically connected to each other in the absence of the conducting layer 210.

Figure 16C:
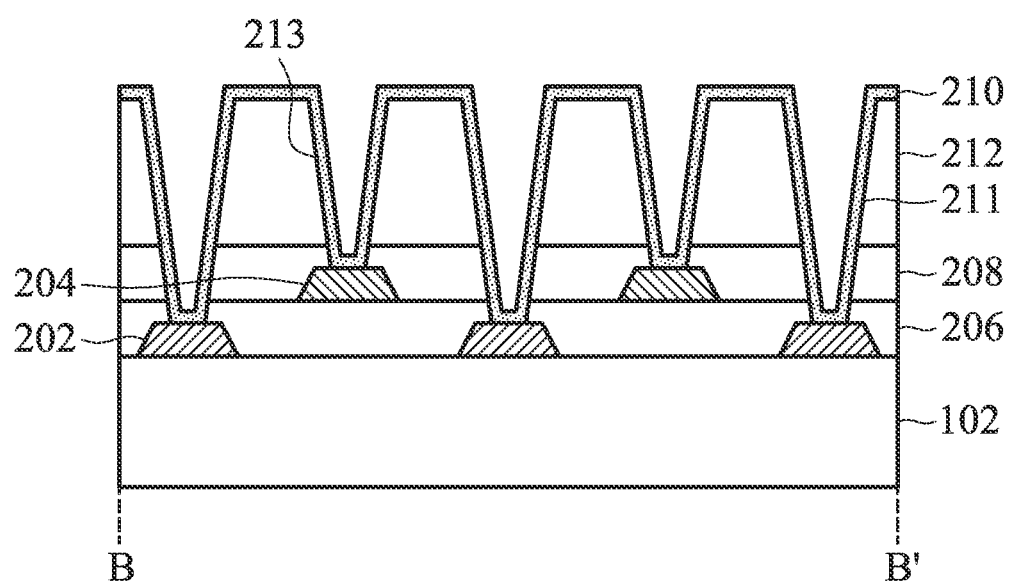

According to other embodiments of the disclosure, as shown in FIG. 16C, a planarization layer 212 can be further formed on the passivation layer 208. A plurality of fourth via holes 211 pass through the dielectric layer 206, the passivation layer 208, and the planarization layer 212, exposing the first conductive blocks 202. A plurality of fifth via holes 213 pass through the passivation layer 208 and the planarization layer 212, exposing the second conductive blocks 204. The conducting layer 210 can be formed on the planarization layer 212 to be filled into the fourth via hole 211 and the fifth via hole 213, resulting in the first conductive blocks 202 and the second conductive blocks 204 being electrically connected to each other via the conducting layer 210. In particular, the planarization layer 212 can be a layer with insulating properties, such as a dielectric material, or photosensitive resin.

Figure 17:
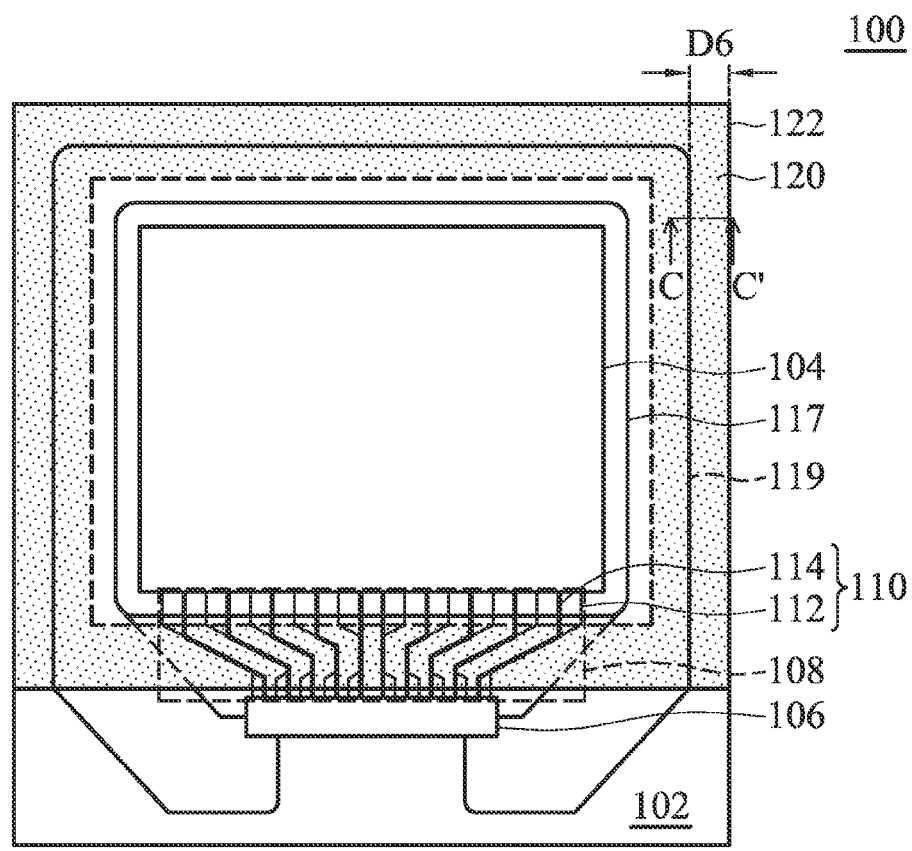
FIG. 17 is a top view of a display device according to another embodiment of the disclosure.

FIG. 17 shows a top view of the display device 100 according to an embodiment of the disclosure. In addition to the display region 104, the driving element 106, the fanout area 108, and the first conductive loop 117, the display device 100 can further include a second conductive loop 119. The second conductive loop 119 can be disposed on substrate 102 outside the display region 104 and the first conductive loop 117. As shown in FIG. 17, the second conductive loop 119 can be disposed on the substrate 102 to surround the display region 104 and connect to the driving element 106. The second conductive loop 119 can serve as an electrostatic discharge (ESD) protection element, preventing the pixels within the display region 104 from damage caused by electrostatic discharge. In addition, a sealant 120 can be disposed on the substrate 102 to cover a part of the second conductive loop 119. In particular, a region defined by projecting the sealant 120 to the substrate 102 serves as a package region (not shown). The second conductive loop 119 within the package region is completely covered by the sealant 120.

The second conductive loop 119 can be single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. According to an embodiment of the disclosure, the second conductive loop 119 can be formed simultaneously during the process for forming the first conductive blocks 202 and the second conductive blocks 204. In addition, the sealant can be a resin.

Figure 18:
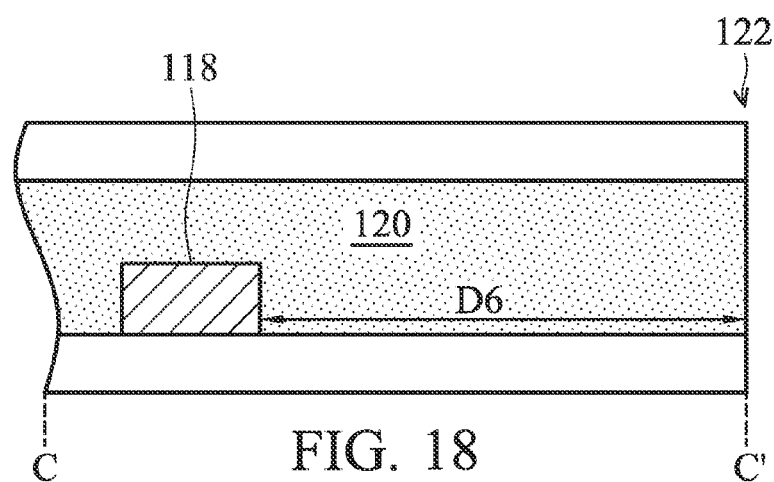
FIG. 18 is a cross-sectional view of the display device shown in FIG. 17 along the line C-C'.

As shown in FIG. 17, the display device 100 has a peripheral boundary 122. In the package region, there is no distance between the sealant 120 and the peripheral boundary 122 (the horizontal distance between the sealant 120 and the peripheral boundary 122 is 0). FIG. 18 is a cross-sectional view of the display device 100 as shown in FIG. 17 along line C-C'. As shown in FIG. 18, the second conductive loop 119 and the peripheral boundary 122 are separated by a distance D6, and the sealant 120 is disposed on the second conductive loop 119 within the peripheral boundary 122. Namely, the space between the second conductive loop 119 and the peripheral boundary 122 is filled with the sealant 120. It should be noted that the distance D6 is from 50 to 300 μm in order to prevent the second conductive loop 119 from erosion and corrosion by moisture and air and achieve the electrostatic discharge (ESD) protection ability of the second conductive loop 119.

Figure 19:
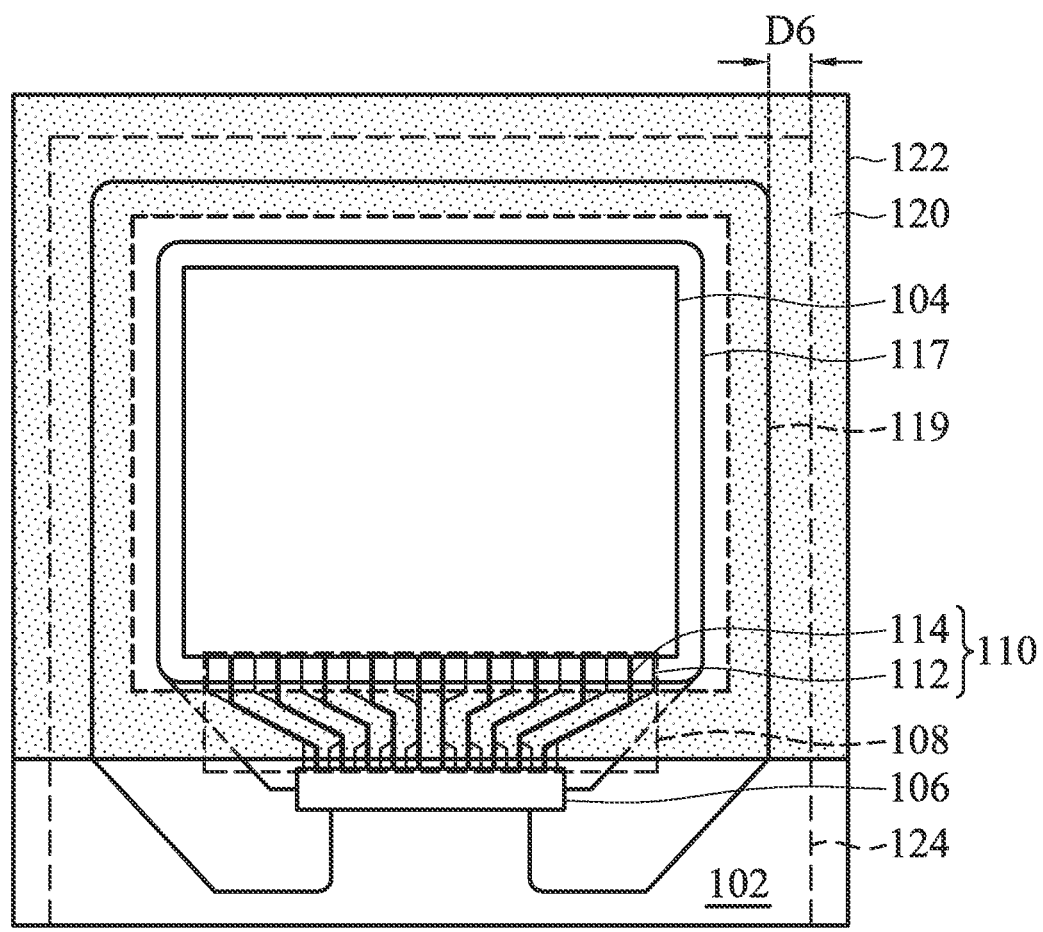
FIGS. 19 and 20 are top views of display device mother substrates according to embodiments of the disclosure.

In order to ensure that the second conductive loop 119 is not be uncovered by the sealant 120 due to a processing error, a so-called "cutting-on-sealant process" is employed during the processes for fabricating the display device of the disclosure. FIG. 19 shows a schematic top view of a display device mother substrate 201 according to an embodiment of the disclosure. The display device as shown in FIG. 17 can be obtained after cutting the display device mother substrate 201 via a cutting process. As shown in FIG. 19, when forming the sealant 120 on the substrate 102, the sealant 120 is formed to cover the predetermined cutting line 124. Therefore, after performing the cutting process (using for example, a single-tool cutting process, a multi-tool cutting process, or a laser cutting process) along the predetermined cutting line 124, there is no distance between the peripheral boundary 122 and the sealant 120 of the obtained display device 100 (such as the display device 100 as shown in FIG. 17). Further, the second conductive loop 119 is separated from the peripheral boundary 122 by the distance D6. As shown in FIG. 19, the sealant 120 can be formed to contact the peripheral boundary 122.

Figure 20:
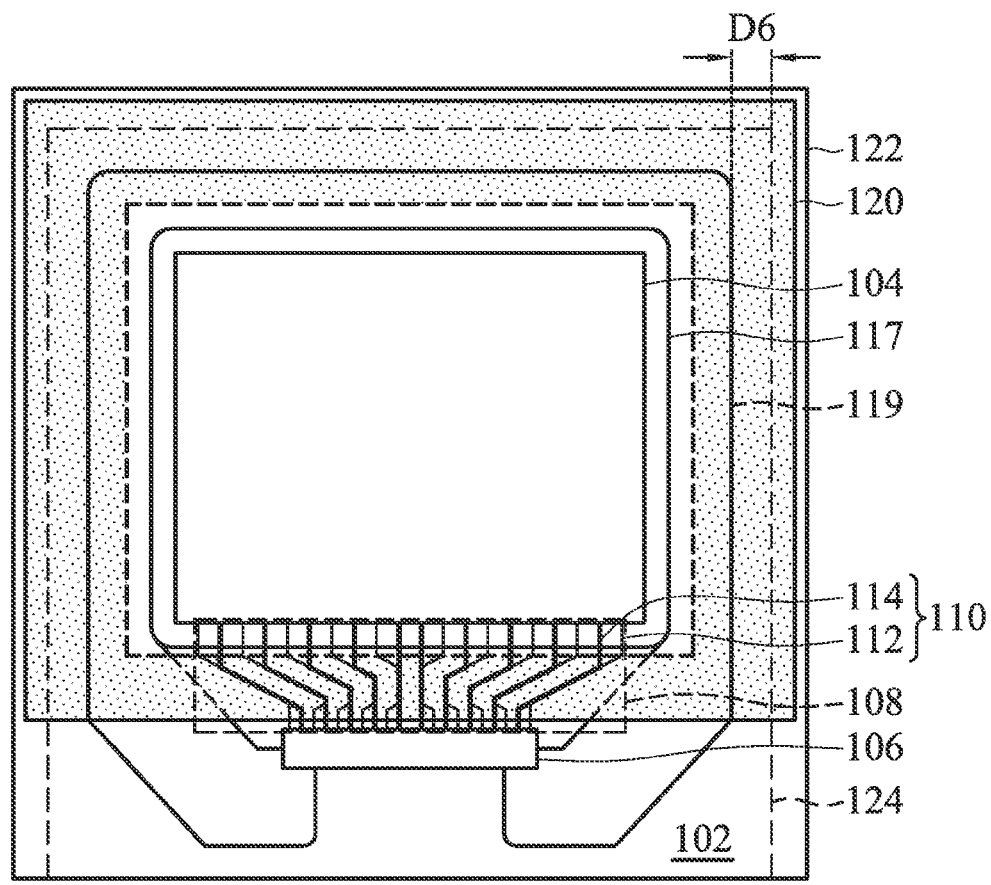

In addition, according to an embodiment of the disclosure, when forming the sealant 120 on the substrate 102, the sealant 120 can cover the predetermined cutting line 124 and not contact the peripheral boundary 122, as shown in FIG. 20. After performing the cutting process along the predetermined cutting line 124, the display device 100 as shown in FIG. 17 can be still obtained.

Accordingly, the area occupied by the fanout area of the display device of the disclosure can be lowered resulting from increasing the conductive line integration degree in the fanout area. Therefore, the display device can have a larger display region under the premise that the size of the display device is fixed. In addition, the display device of the disclosure can further include a first conductive loop outside the display region, wherein the first conductive loop includes a plurality of conductive blocks. Therefore, the first conductive loop can prevent the display device from damage caused by electrostatic discharge during the fabrication of the display device. Moreover, the display device of the disclosure can further include a second conductive loop outside the display region, wherein a sealant is disposed on the second conductive loop and within the peripheral boundary of the display device, in order to achieve high electrostatic discharge ability of the second conductive loop.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display device, comprising:
a first substrate comprising a pixel-displaying region;
a second substrate disposed opposite to the first substrate;
a sealant disposed between the first substrate and the second substrate and disposed outside the pixel-displaying region;
a spacer wall disposed between the first substrate and the second substrate and disposed between the pixel-displaying region and the sealant, wherein a first side of the spacer wall is adjacent to the pixel-displaying region and a second side of the spacer wall is adjacent to the sealant, and a height of the first side is greater than a height of the second side, wherein the first substrate further comprises a planar layer, and the spacer wall is disposed over the planar layer; and
a first alignment layer disposed over the planar layer and covering the spacer wall, wherein a thickness of the first alignment layer over the planar layer is greater than a thickness of the first alignment layer over the spacer wall.

2. The display device as claimed in claim 1, wherein a difference between the height of the first side and the height of second side ranges from about 0.01 µm to 0.3 µm.

3. The display device as claimed in claim 1, wherein a width of the spacer wall ranges from about 10 µm to 200 µm.

4. The display device as claimed in claim 1, wherein a distance from the first side to the pixel-displaying region ranges from about 20 µm to 200 µm.

5. The display device as claimed in claim 1, wherein a width of the sealant ranges from about 200 µm to 900 µm.

6. The display device as claimed in claim 1, further comprising a main spacer disposed between the first substrate and the second substrate and disposed inside the pixel-displaying region, wherein a height of the main spacer is greater than a height of the spacer wall.

7. The display device as claimed in claim 1, wherein the spacer wall is disposed over the first substrate, and the display device further comprises a first gap between the spacer wall and the second substrate, wherein a height of the first gap ranges from about 0.1 µm to 1.5 µm.

8. The display device as claimed in claim 1, wherein the sealant extends from the second side to the first side by a distance ranging from about 20% to 90% of a width of the spacer wall.

9. The display device as claimed in claim 1, wherein the spacer wall comprises a corner region and a longitudinal region, wherein a width of the corner region is different from a width of the longitudinal region.

10. The display device as claimed in claim 9, wherein the width of the corner region is greater than the width of the longitudinal region.

11. The display device as claimed in claim 9, wherein the width of the corner region is smaller than the width of the longitudinal region.

12. The display device as claimed in claim 1, wherein the first substrate further comprises a first color filter layer disposed under the spacer wall and corresponding to the spacer wall.

13. The display device as claimed in claim 12, wherein a width of the first color filter layer is smaller than a width of the spacer wall.

14. The display device as claimed in claim 12, wherein a width of the first color filter layer is greater than a width of the spacer wall.

15. The display device as claimed in claim 12, wherein the first substrate further comprises a second color filter layer disposed under the spacer wall and corresponding to the spacer wall, wherein a boundary between the first color filter layer and the second color filter layer is disposed under the spacer wall and corresponds to the spacer wall.

16. A display device, comprising:
a first substrate comprising a pixel-displaying region;
a second substrate disposed opposite to the first substrate;
a sealant disposed between the first substrate and the second substrate and disposed outside the pixel-displaying region; and
a spacer wall disposed between the first substrate and the second substrate and disposed between the pixel-displaying region and the sealant, wherein a first side of the spacer wall is adjacent to the pixel-displaying region and a second side of the spacer wall is adjacent to the sealant, and a height of the first side is greater than a height of the second side, wherein the spacer wall comprises a corner region and a longitudinal region, wherein a width of the corner region is smaller than a width of the longitudinal region.

17. A display device, comprising:
a first substrate comprising a pixel-displaying region;
a second substrate disposed opposite to the first substrate;
a sealant disposed between the first substrate and the second substrate and disposed outside the pixel-displaying region;
a spacer wall disposed between the first substrate and the second substrate and disposed between the pixel-displaying region and the sealant, wherein a first side of the spacer wall is adjacent to the pixel-displaying region and a second side of the spacer wall is adjacent to the sealant, and a height of the first side is greater than a height of the second side, wherein the second substrate further comprises an insulating layer, and the spacer wall is disposed over the insulating layer; and
a second alignment layer disposed over the insulating layer and covering the spacer wall, wherein a thickness of the second alignment layer over the insulating layer is greater than a thickness of the second alignment layer over the spacer wall.

18. The display device as claimed in claim 17, wherein the spacer wall is disposed over the second substrate, and the display device further comprises a second gap between the spacer wall and the first substrate, wherein a height of the second gap ranges from about 0.1 µm to 1.5 µm.

* * * * *